United States Patent
Akiyama et al.

(10) Patent No.: US 9,367,393 B2
(45) Date of Patent: Jun. 14, 2016

(54) STORAGE CONTROL APPARATUS AND STORAGE CONTROL METHOD

(71) Applicant: FUJITSU LIMITED, Kawasaki-shi, Kanagawa (JP)

(72) Inventors: Shigeru Akiyama, Kawasaki (JP); Yasuhiro Ogasawara, Fujisawa (JP); Tsukasa Matsuda, Kawasaki (JP); Hitoshi Kosokabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 14/547,179

(22) Filed: Nov. 19, 2014

(65) Prior Publication Data

US 2015/0154073 A1 Jun. 4, 2015

(30) Foreign Application Priority Data

Dec. 2, 2013 (JP) ................ 2013-249542

(51) Int. Cl.
*G06F 11/10* (2006.01)
*G06F 12/08* (2016.01)
*G06F 3/06* (2006.01)

(52) U.S. Cl.
CPC .............. *G06F 11/1076* (2013.01); *G06F 3/06* (2013.01); *G06F 11/1008* (2013.01); *G06F 12/0868* (2013.01)

(58) Field of Classification Search
CPC ............ G06F 11/1004; G06F 11/1008; G06F 11/1076; G06F 12/0868
See application file for complete search history.

(56) References Cited

U.S. PATENT DOCUMENTS

| 5,568,628 | A | * | 10/1996 | Satoh | G11C 29/70 711/113 |
| 5,617,432 | A | * | 4/1997 | Eggenberger | G06F 11/10 360/48 |
| 6,101,574 | A | * | 8/2000 | Kumasawa | G06F 12/16 711/113 |
| 8,230,317 | B2 | * | 7/2012 | Amann | G06F 3/061 714/807 |
| 8,307,271 | B1 | * | 11/2012 | Liu | G06F 11/1004 714/807 |
| 2006/0129901 | A1 | | 6/2006 | Arataki et al. | |
| 2008/0195837 | A1 | | 8/2008 | Ishii et al. | |
| 2010/0211703 | A1 | | 8/2010 | Kasahara et al. | |

FOREIGN PATENT DOCUMENTS

| JP | 2006-164141 | 6/2006 |
| JP | 2008-197804 | 8/2008 |
| JP | 2012-504788 | 2/2012 |

* cited by examiner

*Primary Examiner* — Shelly A Chase
(74) *Attorney, Agent, or Firm* — Fujitsu Patent Center

(57) ABSTRACT

A storage control apparatus converts data in a variable-length data format including a field into data in a fixed-length data format and stores the converted data in the fixed-length data format in a storage apparatus. The storage control apparatus includes a data storage memory, a writing unit, and a verification information adding unit. The writing unit writes the data in the variable-length data format to divided regions of the data storage memory. The verification information adding unit adds verification information to the field of the variable-length data format which is written to one or more of the divided regions. Thus, the storage control apparatus is able to check each divided region for a data error.

12 Claims, 26 Drawing Sheets

| DATA TRANSFER TIMING | CACHE MEMORY #0 | CACHE MEMORY #1 | CACHE MEMORY #2 | HDD #0 |
|---|---|---|---|---|
| FROM CA #4 TO CM #2 | YET TO BE WRITTEN | YET TO BE WRITTEN | DATA ERROR a | YET TO BE WRITTEN |
| FROM CM #2 TO CM #0 AND CM #1 | DATA ERROR b | DATA ERROR c | SUCCESSFULLY WRITTEN | YET TO BE WRITTEN |
| FROM CM #0 TO HDD #0 | SUCCESSFULLY WRITTEN | SUCCESSFULLY WRITTEN | SUCCESSFULLY WRITTEN | DATA ERROR d |

200 TABLE ILLUSTRATING ERROR OCCURRENCE STATUS DURING DATA ACCESS

FIG. 4

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2013-249542, filed on Dec. 2, 2013, the entire contents of which are incorporated herein by reference.

FIELD

The embodiments discussed herein are related to a storage control apparatus and a storage control method.

BACKGROUND

Disc array apparatuses (also called as "RAID (redundant arrays of inexpensive disks) apparatuses") have a configuration that enhances high-speed data access and data-failure resistance, and are used commonly as external storage apparatuses for use in information processing systems. The disk array apparatuses are often used in open systems that run on general-purpose operating systems of different types, and therefore have data formats of fixed-length records.

On the other hand, mainframe systems handle data formats of variable-length records. Thus, a storage control apparatus converts a data format of variable-length records into a data format of fixed-length records so as to allow access from a mainframe system to an external storage apparatus.

When storing data in the external storage apparatus, an error check code is added to the data such that a determination of whether there is an error is made upon reading the stored data again. For example, in CKD formats for mainframe systems, an error check code is added to each field of a record. In fixed-length data formats, an error check code is added to each logical block.

Please see, for example, Japanese Laid-open Patent Publications No. 2006-164141 and No. 2008-197804.

The storage control apparatus converts the data format of data received from a mainframe host, temporarily stores the data in its memory, and then stores the data in the external storage apparatus. The storage control apparatus may fail to write the data to the external storage apparatus due to an error occurring in the data. In this case, the storage control apparatus discards the erroneous data, transmits an error response to the mainframe host, and performs a host retry.

However, depending on the condition of the data error, the host retry may fail, leading to an error state in which the erroneous data is retained in the memory (for example, pinned data). In the case of such an error state, the data needs to be recovered by an engineer, which results in a recovery cost in terms of time, man-hours, expenses, and so on.

That is, by improving the performance of recovering from an error state, the recovery cost for the storage control apparatus may be reduced.

SUMMARY

According to one aspect of the invention, a storage control apparatus converts data in a variable-length data format including a predetermined field into data in a fixed-length data format, and stores the converted data in the fixed-length data format in a storage apparatus. The storage control apparatus includes one or more processors configured to perform a procedure including: writing the data in the variable-length data format to one or more consecutive divided regions in a data storage memory, each of the divided regions having a divided length obtained by dividing the fixed-length data; and adding verification information to the predetermined field of the variable-length data format that is written to the one or more divided regions, the verification information allowing checking for a data error in the divided region where the predetermined field is located.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a state after occurrence of a write error according to the second embodiment;

DESCRIPTION OF EMBODIMENTS

Figure 1:
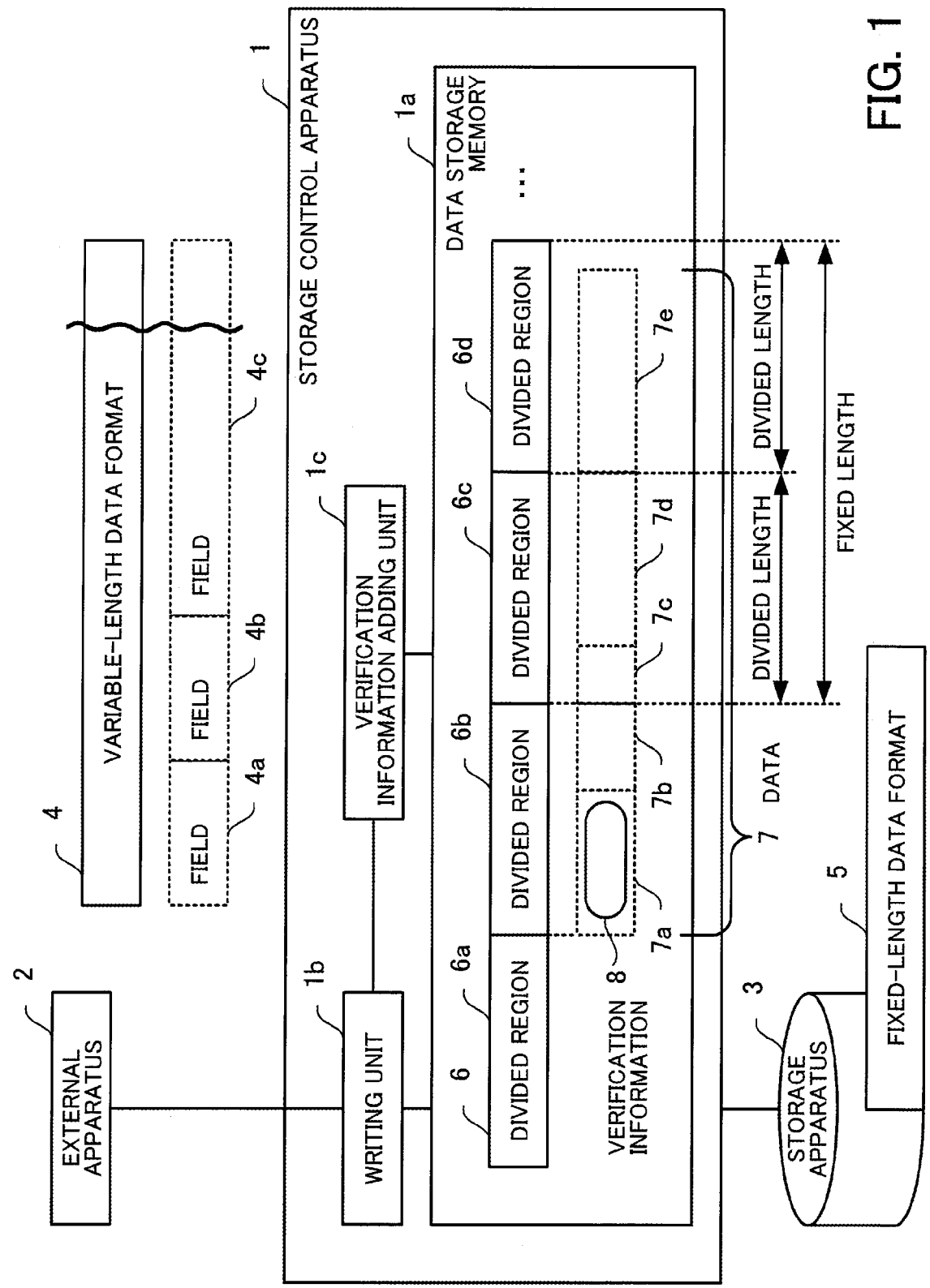
FIG. 1 illustrates an example of the configuration of a storage control apparatus according to a first embodiment.

Several embodiments will be described below with reference to the accompanying drawings, wherein like reference numerals refer to like elements throughout.

Embodiments will be described below with reference to the accompanying drawings.

(a) First Embodiment

First, a storage control apparatus 1 of a first embodiment will be described with reference to FIG. 1. FIG. 1 illustrates an example of the configuration of the storage control apparatus 1 according to the first embodiment.

The storage control apparatus 1 receives a data write instruction from an external apparatus 2, and stores data in a storage apparatus 3. The storage control apparatus 1 also receives a data read instruction from the external apparatus 2, and reads data from the storage apparatus 3 so as to respond to the external apparatus 2.

The external apparatus 2 instructs the storage control apparatus 1 to write data to or read data from the storage apparatus 3. Data handled by the external apparatus 2 has a variable-length data format 4. The variable-length data format 4 includes a plurality of fields (for example, fields 4a, 4b, and 4c). The external apparatus 2 is, for example, a mainframe host included in a mainframe system, and is an upper apparatus of the storage control apparatus 1.

The storage apparatus 3 is capable of storing data, and has a fixed-length data format 5. The storage apparatus 3 serves as an external storage apparatus for the external apparatus 2. The storage apparatus 3 is controlled by the storage control apparatus 1. Thus, data is read from or written to the storage apparatus 3 via the storage control apparatus 1. The storage apparatus 3 is, for example, a hard disk drive (HDD), and is a disk array apparatus including one or more HDDs.

The storage control apparatus 1 receives data in the variable-length data format 4 including the fields 4a, 4b, and 4c from the external apparatus 2. The storage control apparatus 1 converts the data in the variable-length data format 4 into data in the fixed-length data format 5. The storage control apparatus 1 stores the converted data in the fixed-length data format 5 in the storage apparatus 3.

The storage control apparatus 1 includes a data storage memory 1a, a writing unit 1b, and a verification information adding unit 1c. The data storage memory 1a includes a plurality of divided regions 6 such that data may be stored in each divided region. Each of the divided regions 6 has a divided length. The divided length is half a fixed length which is the unit of storing data in the storage apparatus 3. For example, if the unit of storing data in the storage apparatus 3 is 512 bytes, the divided length is 256 bytes.

In this example, the storage control apparatus 1 has the divided regions 6 each having the divided length which is half the fixed length. However, the storage control apparatus 1 may have divided regions each having a length which is one-fourth or one-eighth the fixed length. For example, in the case where the unit of storing data in the storage apparatus 3 is 4,096 bytes, the divided length may be one-eighth of 4,096 bytes, that is, 512 bytes.

The writing unit 1b writes data in the variable-length data format 4 to the divided regions 6 of the data storage memory 1a. If the size of the data in the variable-length data format 4 is less than or equal to the divided length, the writing unit 1b writes the data in the variable-length data format 4 to a single divided region 6. If the size of the data in the variable-length data format 4 is greater than the divided length, the writing unit 1b writes the data in the variable-length data format 4 to two or more consecutive divided regions 6.

For example, data 7 having a size greater than two times the divided length and less than three times the divided length is written to three divided regions 6b, 6c, and 6d. Data 7a corresponding to the field 4a and data 7b corresponding to a part (front part) of the field 4b are written to the divided region 6b. Data 7c corresponding to a part (rear part) of the field 4b and data 7d corresponding to a part (front part) of the field 4c are written to the divided region 6c. Data 7e corresponding to a part (rear part) of the field 4c is written to the divided region 6d.

In this way, the writing unit 1b writes the data in the variable-length data format 4 to the divided regions 6 of the data storage memory 1a.

The verification information adding unit 1c adds verification information 8 to the field 4a of the variable-length data format 4 which is written to one or more of the divided regions 6. The verification information 8 is information that allows checking for an error in data (the data 7a and the data 7b) in the divided region 6b containing the field 4a. For example, the verification information 8 is a check code for cyclic redundancy check (CRC) or the like.

Thus, the storage control apparatus 1 is able to check each divided region 6 for a data error. For example, in the case where the storage control apparatus has failed to write data in the fixed-length data format 5 including the divided region 6b to the storage apparatus 3, the storage control apparatus 1 may determine whether the data in the divided region 6b is the cause of the error based on the verification information 8.

For example, in the case of the fixed-length data format 5, it may be possible to detect a data error, using a check code for checking on a fixed length basis. However, although it is possible to determine that there is a data error in either one or both the divided regions 6a and 6b, it is not possible to specify which of the divided regions 6 includes a data error. In the case of the variable-length data format 4, it may be possible to check which field includes a data error, using check codes added to the respective fields 4a, 4b, and 4c. However, with these check codes, it is not possible to specify which of the divided regions 6 includes a data error when a field is written across the plurality of divided regions 6.

According to the storage control apparatus 1, even in the case where the storage control apparatus 1 receives data in such a variable-length data format and converts the data into a fixed-length data format, it is possible to determine which of the divided regions 6 includes a data error. Since the storage control apparatus 1 is able to check each divided region 6 to determine whether there is a data error, it is possible to improve the recovery performance upon occurrence of a data error. With this storage control apparatus 1, it is possible to reduce the workload for data recovery by an engineer, and thus to reduce the recovery cost in terms of time, man-hours, expenses, and so on.

(b) Second Embodiment

Figure 2:
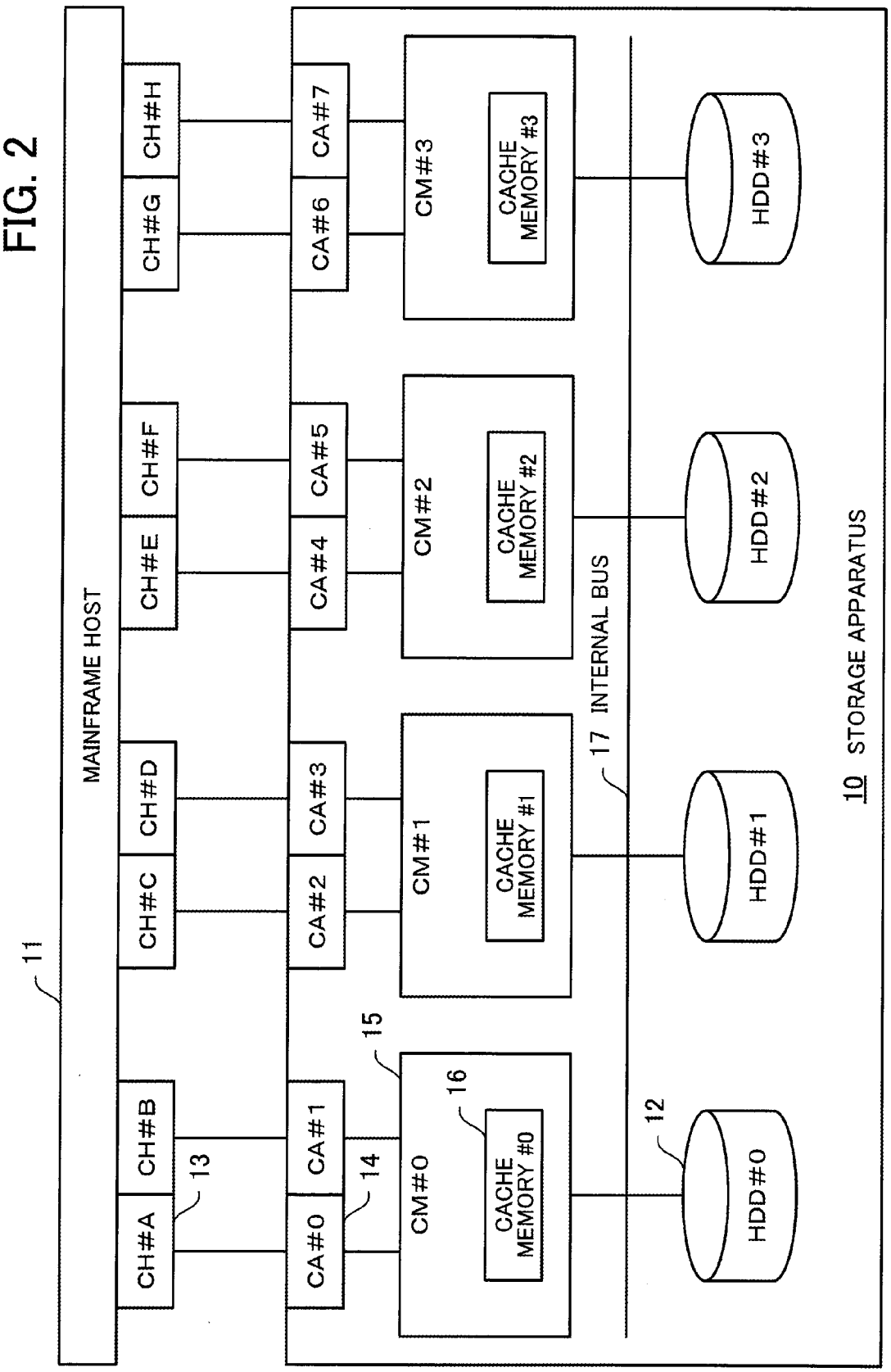
FIG. 2 illustrates an example of the connection between a storage apparatus and a mainframe host, and an example of the configuration of the storage apparatus according to a second embodiment.

In the following, the connection between a storage apparatus 10 and a mainframe host 11 and the configuration of the storage apparatus 10 according to a second embodiment will be described with reference to FIG. 2. FIG. 2 illustrates an example of the connection between the storage apparatus 10 and the mainframe host 11, and an example of the configuration of the storage apparatus 10 according to the second embodiment.

The storage apparatus 10 controls HDDs 12 that serve as an external storage apparatus for the mainframe host 11. The storage apparatus 10 receives a data write instruction from the mainframe host 11, and stores data in the HDDs 12. The storage apparatus 10 also receives a data read instruction from the mainframe host 11, and reads data from the HDDs 12 so as to respond to the mainframe host 11.

The mainframe host 11 is included in a mainframe system, and is an upper apparatus of the storage apparatus 10. The mainframe host 11 includes channels (CHs) 13. The channels 13 are interface (I/F) modules of the mainframe host 11. The mainframe host 11 includes eight channels 13, which are channels #A, #B, #C, #D, #E, #F, #G, and #H. Note that each of HDDs #0, #1, #2, and #3 may be a disk array apparatus including one or more HDDs.

The storage apparatus 10 includes the HDDs 12, channel adapters (CAs) 14, and controller modules (CMs) 15. Each HDD 12 is a data storage apparatus that stores a record in a fixed-length data format of 512 bytes. The storage apparatus 10 includes four HDDs 12, which are HDDs #0, #1, #2, and #3.

The channel adapters 14 are interface modules of the storage apparatus 10. The storage apparatus 10 includes eight channel adapters 14, which are channel adapters #0, #1, #2, #3, #4, #5, #6, and #7.

Each controller module 15 performs overall control of the storage apparatus 10, including exclusive control of data, management of a cache memory (data storage memory) 16 of the controller module 15, read and write control of the HDD 12, and so on. Each channel adapter 14 reads, from the cache memory 16, data corresponding to a read request (read I/O) received from the mainframe host 11, and transmits the data to the mainframe host 11. Each channel adapter 14 also writes, to the cache memory 16, data corresponding to a write request (write I/O) received from the mainframe host 11. The storage apparatus 10 includes the four controller modules 15, which are controller modules #0, #1, #2, and #3.

Each controller module 15 is connected to two channel adapters 14 so as to have a redundant configuration. The controller module #0 is connected to the channel adapters #0 and #1, and the controller module #1 is connected to the channel adapters #2 and #3. The controller module #2 is connected to the channel adapters #4 and #5, and the controller module #3 is connected to the channel adapters #6 and #7.

Each channel adapter 14 is connected to the corresponding channel 13 of the mainframe host 11. The channel adapter #0 is connected to the channel #A, and the channel adapter #1 is connected to the channel #B. The channel adapter #2 is connected to the channel #C, and the channel adapter #3 is connected to the channel #D. The channel adapter #4 is connected to the channel #E, and the channel adapter #5 is connected to the channel #F. The channel adapter #6 is connected to the channel #G, and the channel adapter #7 is connected to the channel #H.

Each controller module 15 includes the cache memory 16. The cache memory 16 stores data read from the HDD 12, and also stores data corresponding to a write request received from the mainframe host 11. The controller module #0 includes the cache memory #0; the controller module #1 includes the cache memory #1; the controller module #2 includes the cache memory #2; and the controller module #3 includes the cache memory #3.

Each controller module 15 connects to the HDD 12 via an internal bus 17. Each controller module 15 is able to access all the HDDs 12, but is assigned the HDD 12 for which the controller module 15 is responsible. The controller module #0 is responsible for the HDD #0; the controller module #1 is responsible for the HDD #1; the controller module #2 is responsible for the HDD #2; and the controller module #3 is responsible for the HDD #3. With this configuration, the storage apparatus 10 is able to prevent access conflict to the HDDs 12 among the controller modules 15, and thus to prevent a reduction in memory resources of the controller modules 15 and a reduction in the performance of the HDDs 12.

Figure 3:
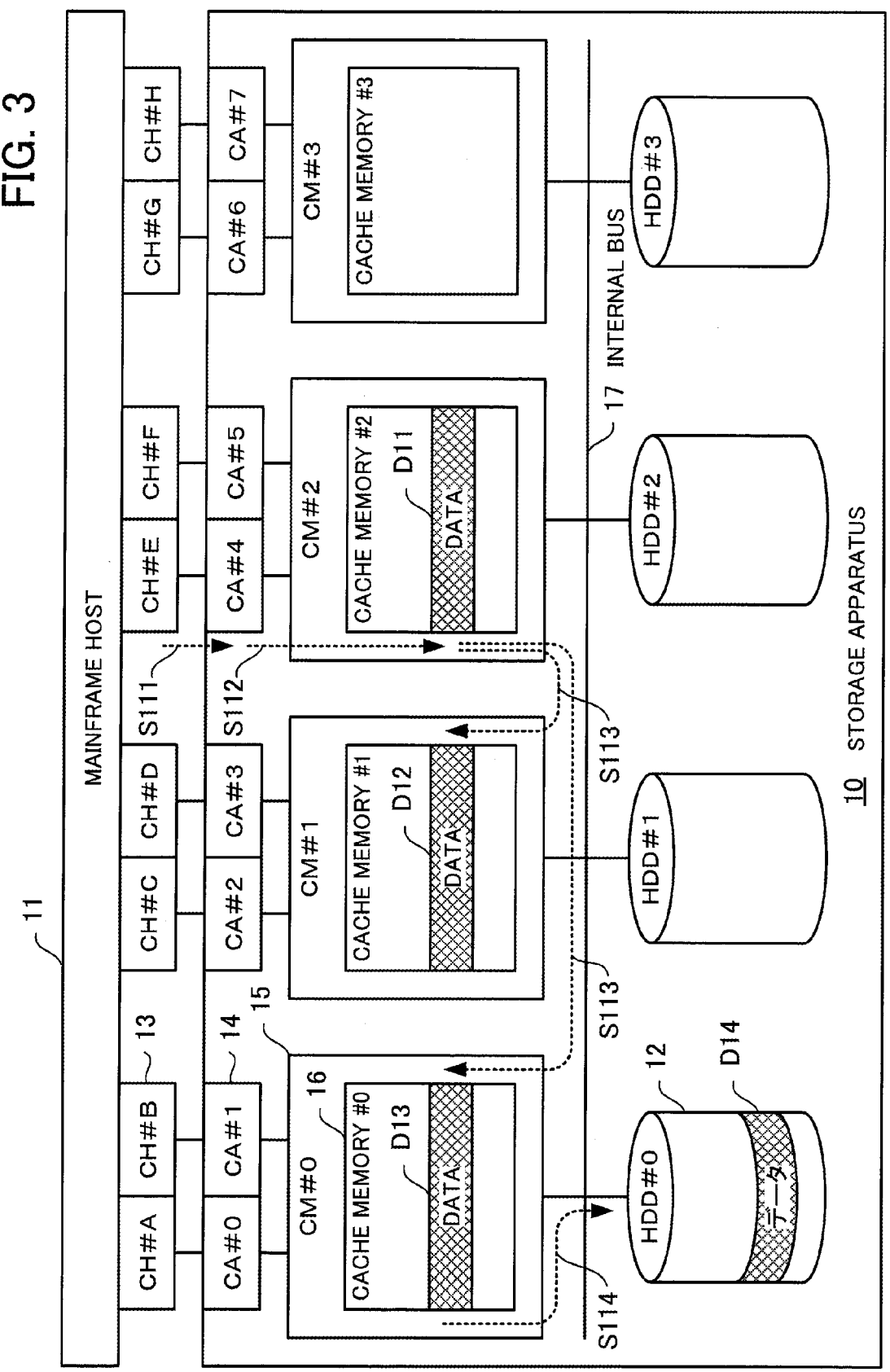
FIG. 3 illustrates an example of the procedure for accessing data from the mainframe host to an HDD according to the second embodiment.

In the following, the procedure for accessing data from the mainframe host 11 to the HDD 12 according to the second embodiment will be described with reference to FIG. 3. FIG. 3 illustrates an example of the procedure for accessing data from the mainframe host 11 to the HDD 12 according to the second embodiment.

First, the format of data exchanged between modules will be described. Between the mainframe host 11 and the storage apparatus 10, that is, between the channel 13 and the channel adapter 14, data in a variable-length data format is exchanged. In the second embodiment, a CKD format is used as the variable-length data format. The variable-length data format may handle data of a data length ranging, for example, from 1 byte to 47 kilobytes.

Between the cache memory 16 of the controller module 15 and the channel adapter 14, data in a fixed-length data format with the half logical block size is exchanged. The channel adapter 14 performs mutual conversion between the variable-length data format and the fixed-length data format. The cache memory 16 manages data in units of the half logical block size.

Between the cache memory 16 of the controller module 15 and the HDD 12, data in a fixed-length data format with the logical block size is exchanged. The HDD 12 records data in units of the logical block size.

The procedure for accessing data between the modules in the above-described data formats will be described with reference to the example illustrated in FIG. 3.

(Step S111) The mainframe host 11 issues a write I/O to the HDD #0 from the channel #E. The storage apparatus 10 receives the write I/O via the channel adapter #4 corresponding to the channel #E. In this step, the data transmitted from the channel #E to the channel adapter #4 is variable-length data in the CKD format.

(Step S112) The channel adapter #4 is assigned the cache memory #2 by the controller module #2, and stores data D11 in the fixed-length data format with the half logical block size converted from the variable-length data in the CKD format to the cache memory #2. Further, the controller module #2 requests the controller module #0 responsible for the HDD #0 and the controller module #1 paired with the controller module #0 to allocate the cache memories 16. Thus, the controller module #2 is assigned the cache memory #0 by the controller module #0, and is assigned the cache memory #1 by the controller module #1. Note that each controller module 15 is paired in advance with another controller module 15. Thus, in the case where one of the paired controller modules 15 fails, the other controller module takes over the processing of the failed controller module 15. This ensures the availability of the storage apparatus 10 even in the case of failure. For example, the controller modules #0 and #1 are paired in advance, and the controller modules #2 and #3 are paired in advance.

(Step S113) The controller module #2 copies the data D11 written by the channel adapter #4 to the cache memories #0 and #1. Thus, the controller module #0 responsible for the HDD #0 stores data D13, and the controller module #1 paired with the controller module #0 stores data D12. In this way, the storage apparatus 10 duplicates the written data.

(Step S114) The controller module #0 writes the data D13 stored in the cache memory #0 to the HDD #0. In this step, the data transmitted from the controller module #0 to the HDD #0 is data in units of the logical block size. Since data D14 stored in the HDD #0 is data in units of the logical block size, the controller module #0 performs read-modify-write (RMW) if needed when writing the data D13 to the HDD #0.

Figure 5:
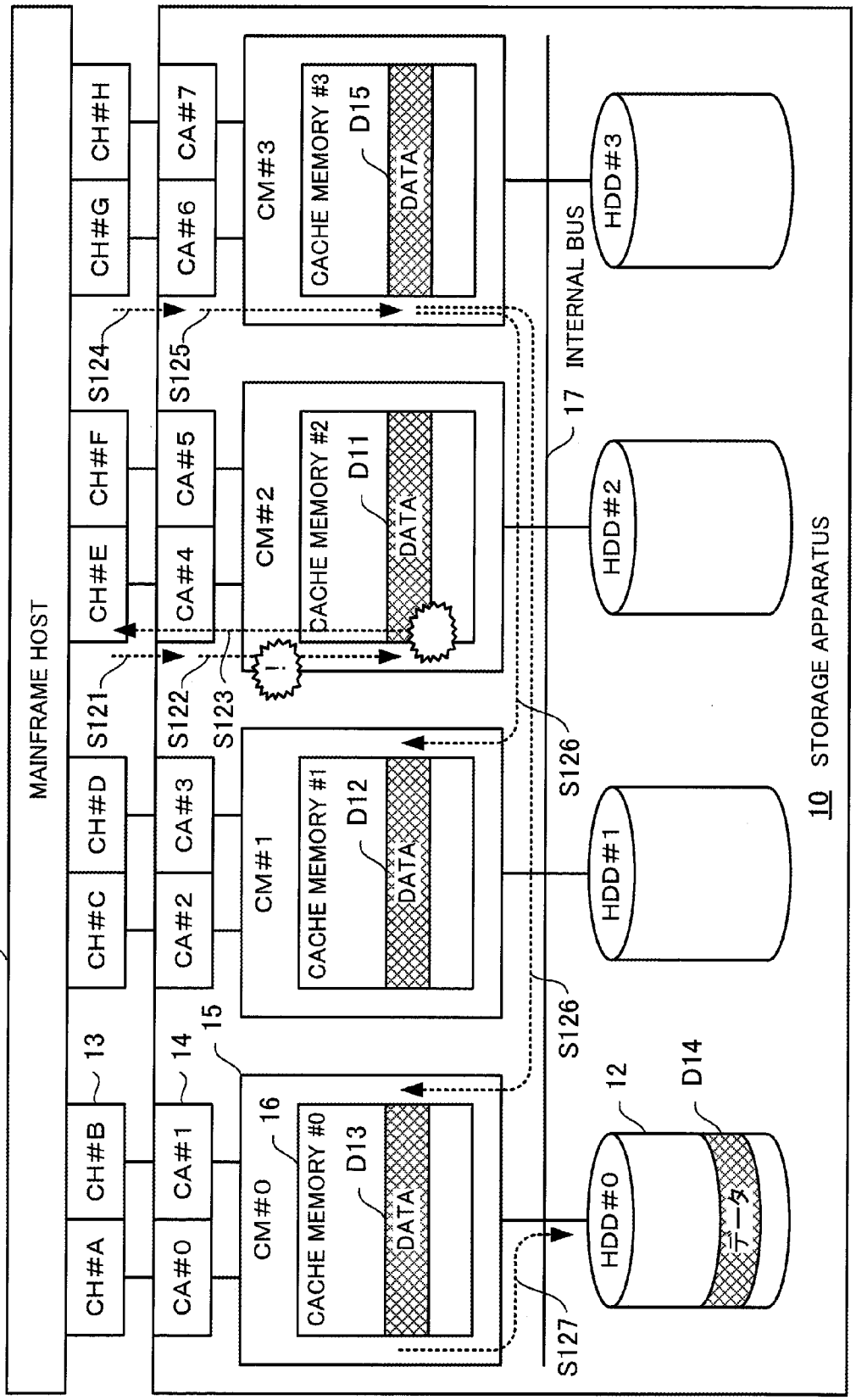
FIG. 5 illustrates an example of a write error that occurred at a write error occurrence timing 1 according to the second embodiment.
Figure 6:
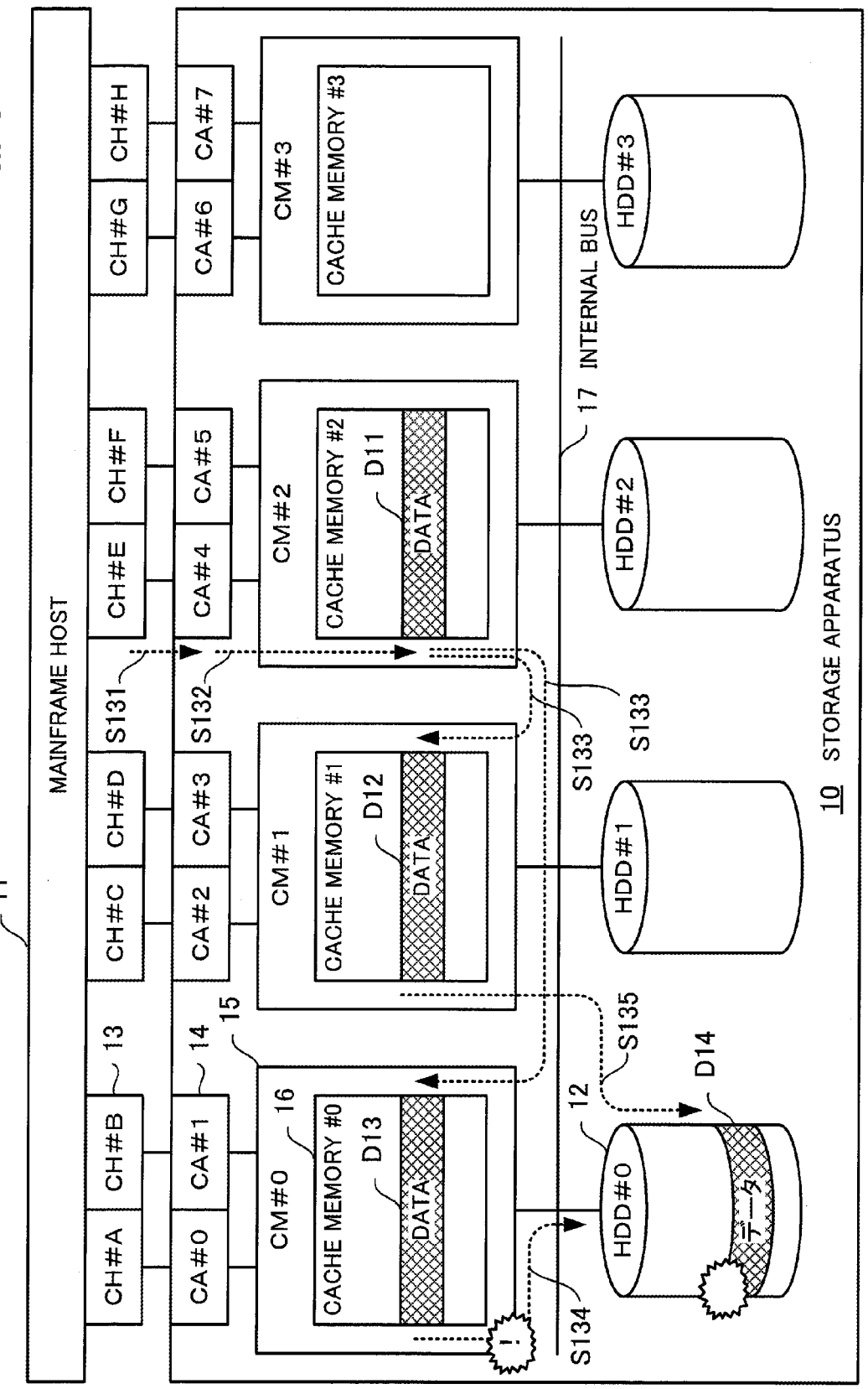
FIG. 6 illustrates an example of a write error that occurred at a write error occurrence timing 3 according to the second embodiment.

In the following, the state after occurrence of a write error during data access from the mainframe host 11 to the HDD 12 according to the second embodiment will be described with reference to FIGS. 4 through 6. FIG. 4 illustrates an example of a state after occurrence of a write error according to the second embodiment.

In the access procedure of FIG. 3, the timing at which a write error occurs during data access from the mainframe host 11 to the HDD 12 includes the following three timings, as presented in a table 200 that indicates error occurrence status during data access.

The first timing is the timing of transferring data from the channel adapter #4 to the controller module #2. That is, one of the write error occurrence timings is the timing (write error occurrence timing 1) of transferring data from the channel adapter 14 to the controller module 15.

The second timing is the timing of transferring data from the channel adapter #2 to the controller module #0 or the controller module #1. That is, another write error occurrence timing is the timing (write error occurrence timing 2) of transferring data from the source controller module 15 to the destination controller modules 15 (the responsible controller module 15 that is responsible for the write destination HDD 12, and the controller module 15 that is paired with the responsible controller module 15).

The third timing is the timing of transferring data from the controller module #0 to the HDD #0. That is, still another write error occurrence timing is the timing (write error occurrence timing 3) of transferring data from the responsible controller module 15 to the write destination HDD 12. Note that, in the case where the responsible controller module 15 fails, the timing of transferring data from the controller module 15 paired with the responsible controller module 15 to the write destination HDD 12 is also included.

First, the write error occurrence timing 1 will be described with reference to FIG. 5. FIG. 5 illustrates an example of a write error that occurred at the write error occurrence timing 1 according to the second embodiment.

(Step S121) The mainframe host 11 issues a write I/O to the HDD #0 from the channel #E. The storage apparatus 10 receives the write I/O via the channel adapter #4 corresponding to the channel #E.

(Step S122) The channel adapter #4 writes the data D11 to the cache memory #2. In this step, an error occurs in the data D11, which is a data error a (FIG. 4). Up to this point, data has not yet been written to the cache memory #0, the cache memory #1, or the HDD #0.

(Step S123) In response to detection of the error in the data D11, the controller module #2 performs a host retry with respect to the mainframe host 11.

(Step S124) The mainframe host 11 issues a write I/O to the HDD #0 from the channel #G different from the channel #E. The storage apparatus 10 receives the write I/O via the channel adapter #6 corresponding to the channel #G.

(Step S125) The channel adapter #6 writes data D15 to the cache memory #3. Subsequently, the storage apparatus 10 performs processing of steps S126 and S127 which is equivalent to that of steps S113 and S114.

In this way, with regard to the write error occurrence timing 1, the storage apparatus 10 returns an error response to the mainframe host 11. Since data has not yet been written to the cache memory #0, the cache memory #1, or the HDD #0, the storage apparatus 10 is able to recover from the data error a by discarding the erroneous data D11 and performing a host retry.

Next, the write error occurrence timing 3 will be described with reference to FIG. 6. FIG. 6 illustrates an example of a write error that occurred at the write error occurrence timing 3 according to the second embodiment.

The storage apparatus 10 performs processing of steps S131 through S133 which is equivalent to that of steps S111 through S113.

(Step S134) The controller module #0 writes the data D13 stored in the cache memory #0 to the HDD #0. In this step, an error occurs in the data D14, which is a data error d (FIG. 4). Up to this point, data has been successfully written to the cache memories #0, #1, and #2.

(Step S135) In response to detection of the data error d, the storage apparatus 10 disconnects the controller module #0 which failed to write data, and changes the controller module responsible for the HDD #0 to the controller module #1. The controller module #1 assigned to be responsible for the HDD #0 writes the data D12 stored in the cache memory #1 to the HDD #0.

In this way, with regard to the write error occurrence timing 3, the storage apparatus 10 returns an error response to the responsible controller module. Since data has been successfully written to the cache memories #0, #1, and #2, the storage apparatus 10 is able to recover from the data error d by discarding the erroneous data D14 and changing the controller module responsible for the HDD #0 to the controller module #1.

Figure 7:
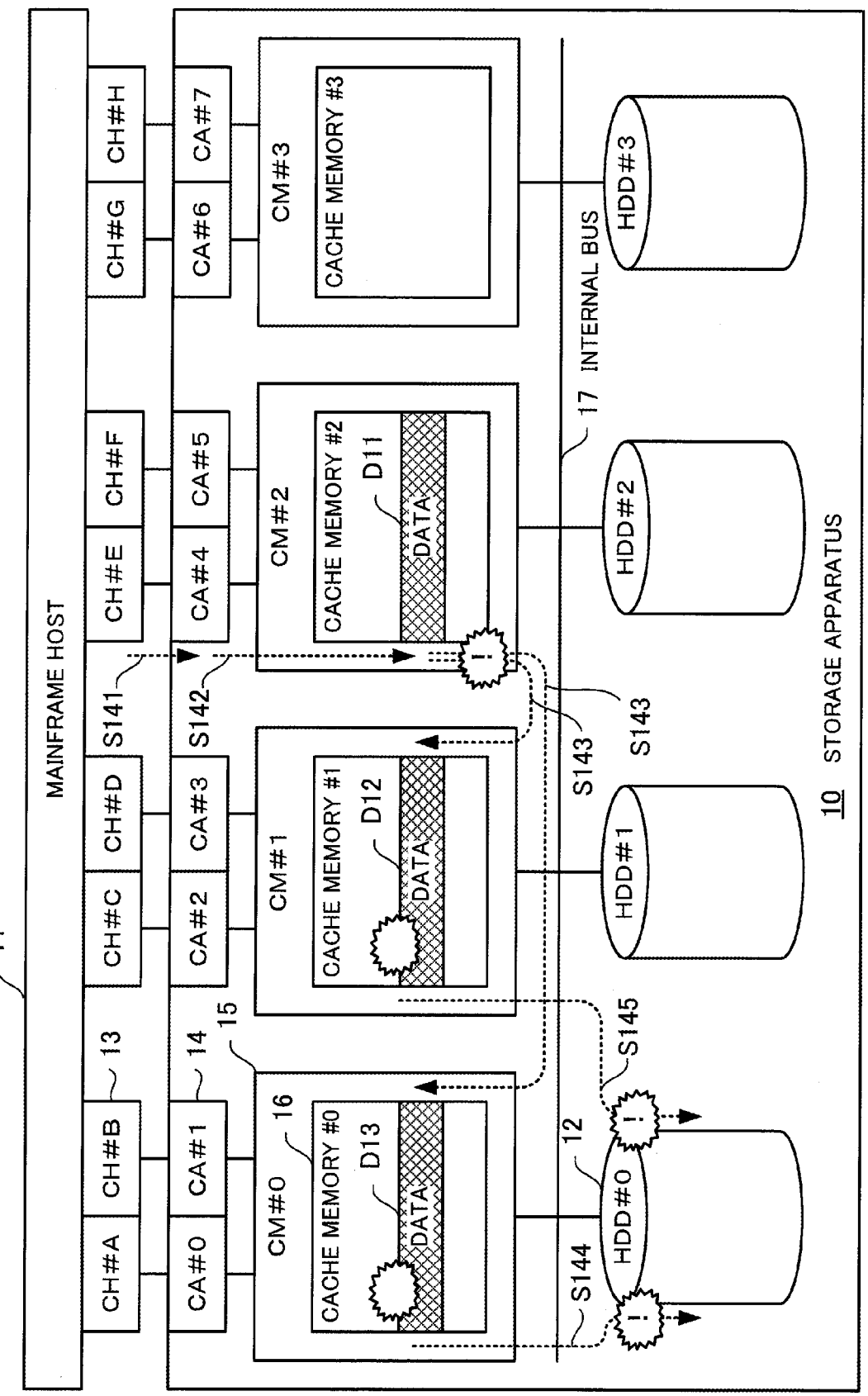
FIG. 7 illustrates an example of a write error that occurred at a write error occurrence timing 2 according to the second embodiment.

Next, the write error occurrence timing 2 will be described with reference to FIG. 7. FIG. 7 illustrates an example of a write error that occurred at the write error occurrence timing 2 according to the second embodiment.

The storage apparatus 10 performs processing of steps S141 and S142 which is equivalent to that of steps S111 and S112.

(Step S143) The controller module #2 copies the data D11 written by the channel adapter #4 to the cache memories #0 and #1. In this step, an error occurs in the data D13, which is a data error b (FIG. 4), and another error occurs in the data D12, which is a data error c (FIG. 4). Up to this point, although data has been successfully written to the cache memory #2, data has not yet been written to the HDD #0.

(Step S144) The controller module #0 attempts to write the data D13 stored in the cache memory #0 to the HDD #0, but fails to write the data D13 to the HDD #0 due to the error in the data D13.

(Step S145) In place of the controller module #0, the controller module #1 attempts to write the data D12 stored in the cache memory #1 to the HDD #0, but fails to write the data D12 to the HDD #0 due to the error in the data D12.

Since it is not possible to write such erroneous data to the HDD 12, the erroneous data is retained in the cache memories 16. The data in this state is called "pinned data". Even in this situation, the storage apparatus 10 is often able to recover from the data error b and the data error c by discarding the erroneous data and performing a host retry. However, in some cases, recovery might not be possible even with a host retry. In the case where recovery is not possible even with a host retry, data needs to be recovered by an engineer, which results in a recovery cost in terms of time, man-hours, expenses, and so on.

Figure 8:
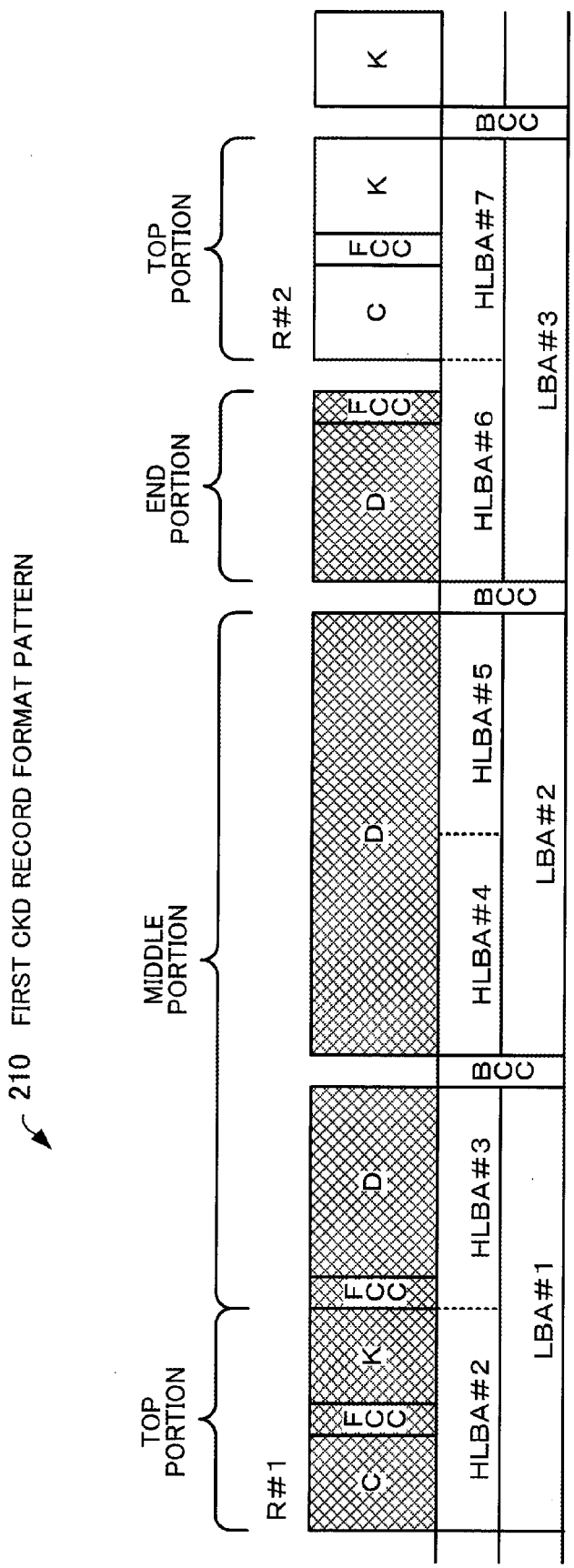
FIG. 8 illustrates an example of a first CKD record format pattern according to the second embodiment.
Figure 9:
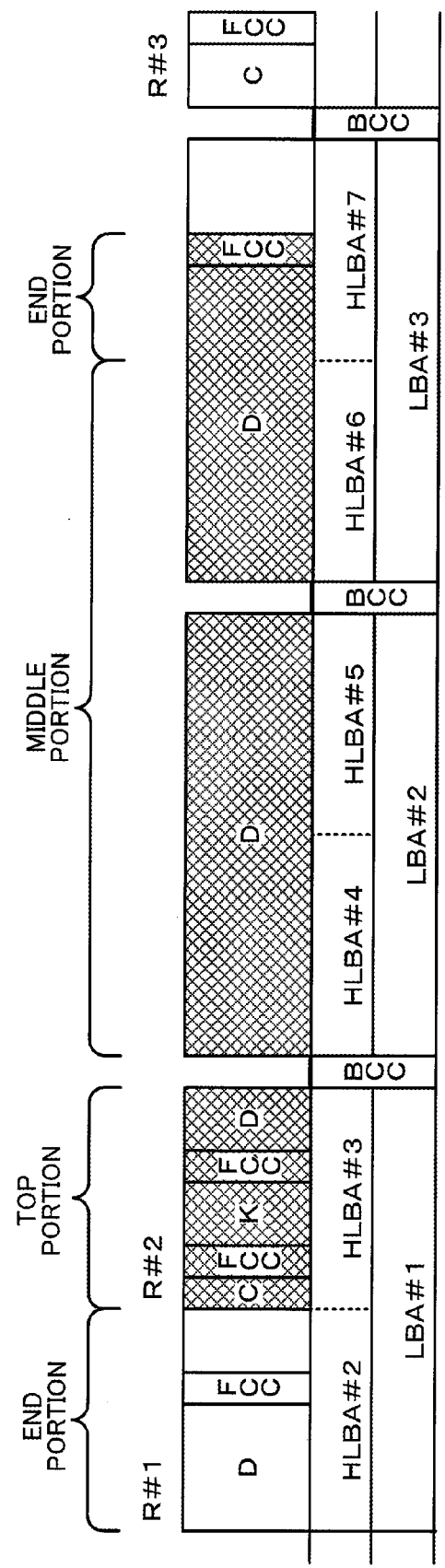
FIG. 9 illustrates an example of a second CKD record format pattern according to the second embodiment.
Figure 10:
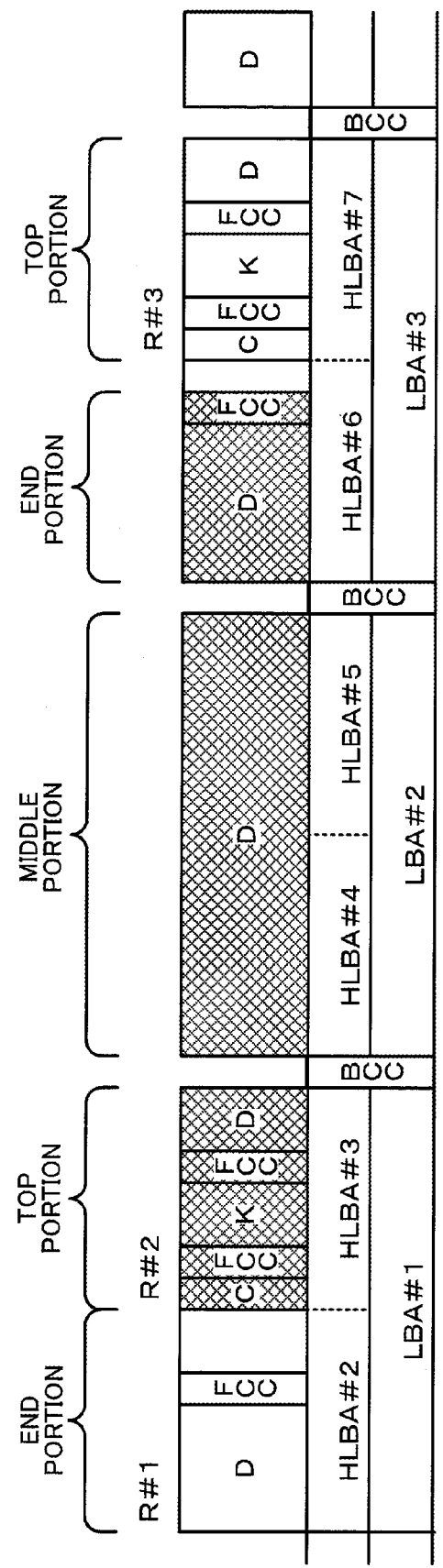
FIG. 10 illustrates an example of a third CKD record format pattern according to the second embodiment.
Figure 11:
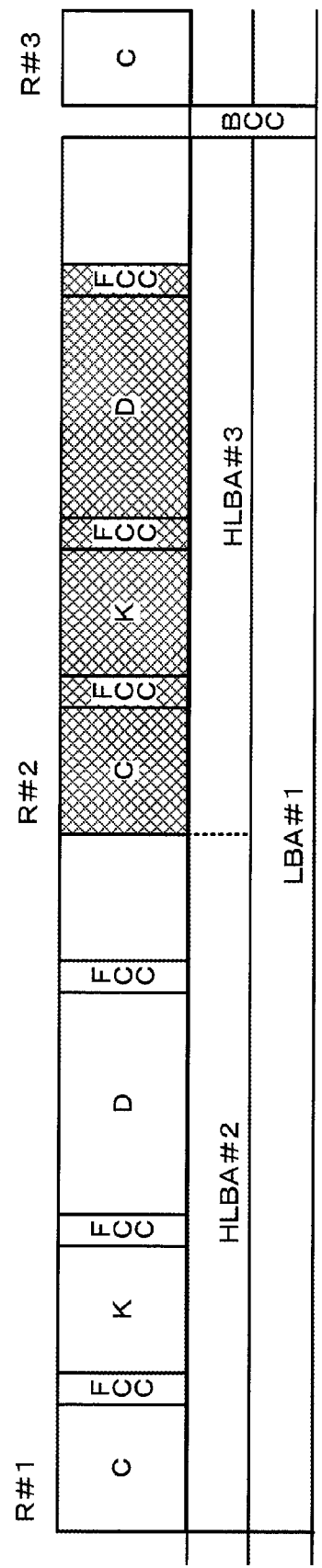
FIG. 11 illustrates an example of a fourth CKD record format pattern according to the second embodiment.
Figure 12:
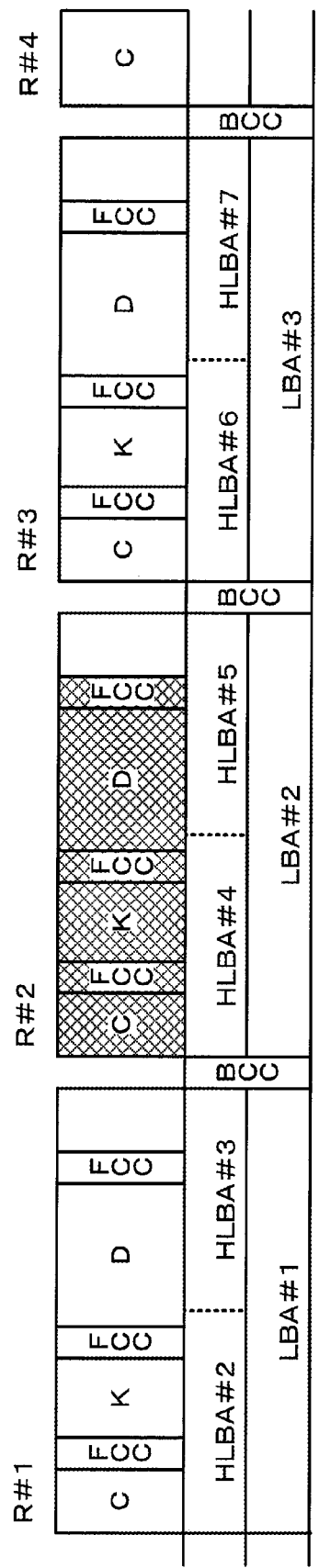
FIG. 12 illustrates an example of a fifth CKD record format pattern according to the second embodiment.

A host retry may fail depending on the format of data and the position where the data error occurred. First, the CKD record format pattern that is converted into the fixed-length data format with the half logical block size and is stored in the cache memory 16 will be described with reference to FIGS. 8 through 12. FIG. 8 illustrates an example of a first CKD record format pattern 210 according to the second embodiment. FIG. 9 illustrates an example of a second CKD record format pattern 211 according to the second embodiment. FIG. 10 illustrates an example of a third CKD record format pattern 212 according to the second embodiment. FIG. 11 illustrates an example of a fourth CKD record format pattern 213 according to the second embodiment. FIG. 12 illustrates an example of a fifth CKD record format pattern 214 according to the second embodiment.

A record in the variable-length data format is converted into the fixed-length data format with the half logical block size and is stored in the cache memory 16.

Now, the CKD record format pattern will be described. A record R#1 in the variable-length data format has a data structure of the CKD record format, and includes the following three fields: a count section (indicated by "C" in FIGS. 8 through 12), a key section (indicated by "K" in FIGS. 8 through 12), and a data section (indicated by "D" in FIGS. 8 through 12). The count section has a fixed length, and includes information on the address and the data length of the record R#1. The key section has a variable length, and is used by the operating system to identify the record R#1. The data section has a variable length, and is an area for storing user data.

As mentioned above, since the cache memory 16 manages data in units of half logical blocks (half logical block addresses (HLBAs)), a record of variable-length data (CKD) is stored from the top of a half logical block (HLBA #2). For example, the record R#1 is stored from the top of the HLBA #2, and a record R#2 is stored from the top of an HLBA #7. That is, two or more records of the CKD data are not stored in a single half logical block. Note that the number of HLBAs containing the middle portion of a record of the CKD data greatly varies depending on the size of the record of the CKD data. The middle portion is located between the top (starting) portion and the end (ending) portion of the record of the CKD data.

Further, an 8-byte error check code (hereinafter referred to as "field check code (FCC)") that is calculated for error protection is written for each field. The FCC (second verification information) is written to the last 8 bytes of each field. The FCC may use CRC, for example.

Each logical block (logical block address (LBA)) includes two half logical blocks, and has an 8-byte error check code (hereinafter referred to as a "block check code (BCC)") calculated for protecting the logical block from errors. The BCC (third verification information) may use CRC, for example.

The first CKD record format pattern 210 is a pattern in which the end portion of a record (record R#1) to be updated (indicated by hatching in FIG. 8) and the top portion of the following record (record R#2) are present together in an LBA. That is, the record R#1 is stored in one of two HLBAs of an LBA #3, which is an HLBA #6, and the record R#2 is stored in the other one of the two HLBAs, which is an HLBA #7.

The second CKD record format pattern 211 is a pattern in which the top portion of a record (record R#2) to be updated and the end portion of the preceding record (record R#1) are present together in an LBA. That is, the record R#1 is stored in one of two HLBAs of an LBA #1, which is an HLBA #2, and the record R#2 is stored in the other one of the two HLBAs, which is an HLBA #3.

The third CKD record format pattern 212 is a pattern in which each of the top portion and the end portion of a record R#2 to be updated is present together with another record in an LBA. The top portion of the record R#2 to be updated is present together with the end portion of the preceding record (record R#1) in an LBA, and the end portion of the record R#2 to be updated is present together with the top portion of the following record (record R#3) in another LBA. That is, the record R#1 is stored in one of two HLBAs of an LBA #1, which is an HLBA #2, and the record R#2 is stored in the other one of the two HLBAs, which is an HLBA #3. Further, the record R#2 is stored in one of two HLBAs of an LBA #3, which is an HLBA #6, and the record R#3 is stored in the other one of the two HLBAs, which is an HLBA #7.

The fourth CKD record format pattern 213 is a pattern in which a record R#2 to be updated is stored within a single HLBA, and is present together with another record in an LBA. That is, a record R#1 is stored in one of two HLBAs of an LBA #1, which is an HLBA #2, and the record R#2 is stored in the other one of the two HLBAs, which is an HLBA #3.

The fifth CKD record format pattern 214 is a pattern in which only a record R#2 to be updated is present in an LBA, and no other records are present therein. That is, the record R#2 is stored in two HLBAs (HLBA #4 and HLBA #5) of an LBA #2.

Among the above-described five CKD record format patterns, the first CKD record format pattern 210 through the fourth CKD record format pattern 213 cause failure of host retry. Of these, the third CKD record format pattern 212 is a variation of the pattern that includes both the first CKD record format pattern 210 and the second CKD record format pattern 211. Further, the fourth CKD record format pattern 213 is a variation of the first CKD record format pattern 210 or the second CKD record format pattern 211.

Figure 13:
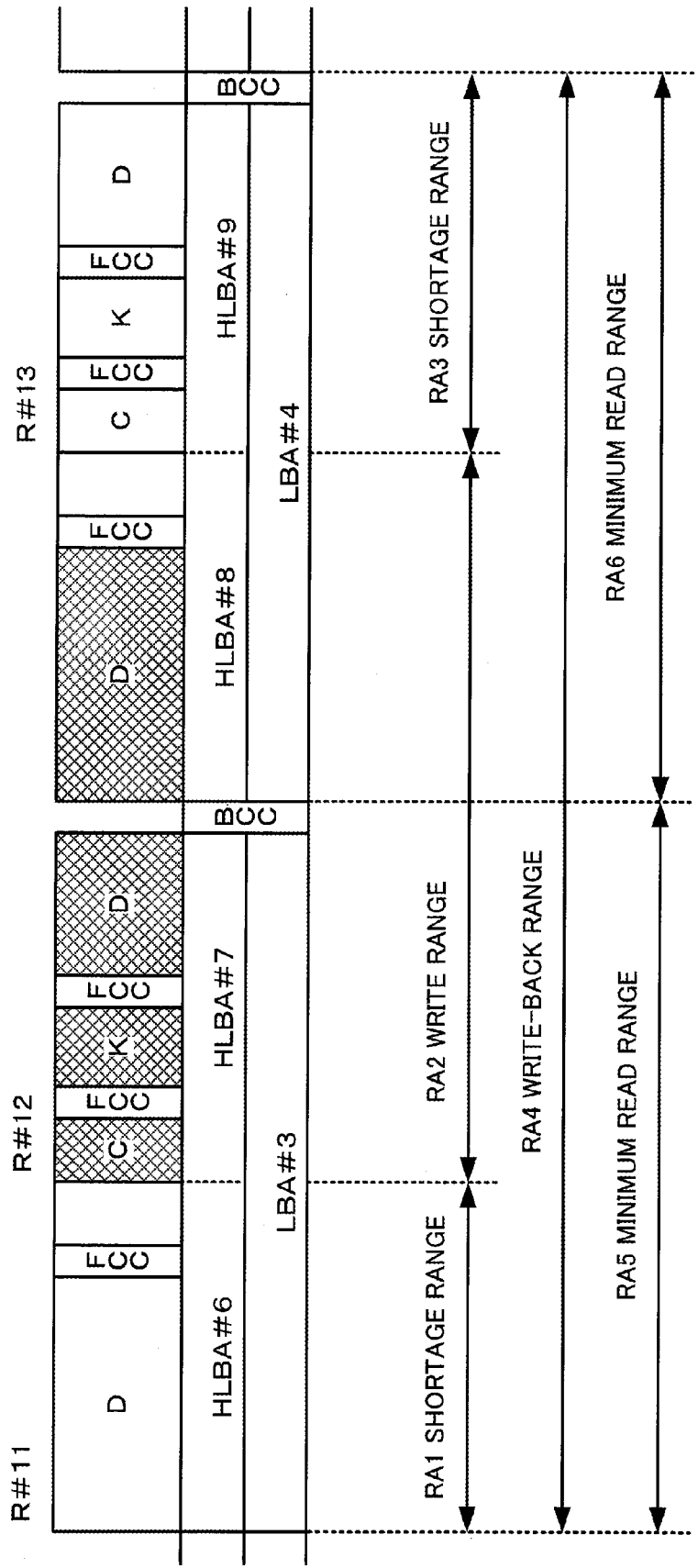
FIG. 13 illustrates an example of a CKD track in which a record to be updated and another record are present together in an LBA.

Now, RMW in the case where a record to be updated is present together with another record in an LBA will be described with reference to FIG. 13. FIG. 13 illustrates an example of a CKD track 220 in which a record to be updated and another record are present together in an LBA. The CKD track 220 is a CKD track corresponding to a simplified version of the third CKD record format pattern 212 of FIG. 10.

RMW is performed when writing a record R#12 to be updated to an LBA #3 and an LBA #4. The channel adapter 14 specifies a range from an HLBA #7 to an HLBA #8 as a write range (write range RA2) for the record R#12 to be updated. Then, in the LBA #3, which is the minimum unit of access to the HDD 12, data (record R#11) in an HLBA #6 becomes a shortage range RA1. Further, in the LBA #4, data (record R#13) in an HLBA #9 becomes a shortage range RA3.

In order to supply data to the shortage ranges RA1 and RA3, the channel adapter 14 reads data in minimum read ranges RA5 and RA6 from the HDD 12. The channel adapter 14 checks whether there is an error in the read data using the BCCs. If there is no error in the read data, the channel adapter 14 merges the write range RA2 with the read data. The channel adapter 14 writes back the merged data, that is, data in a write-back range RA4 to the cache memory 16.

If there is an error in the data in the write-back range RA4, the channel adapter 14 fails to perform RMW. Thus, recovery by a host retry is not possible.

Figure 14:
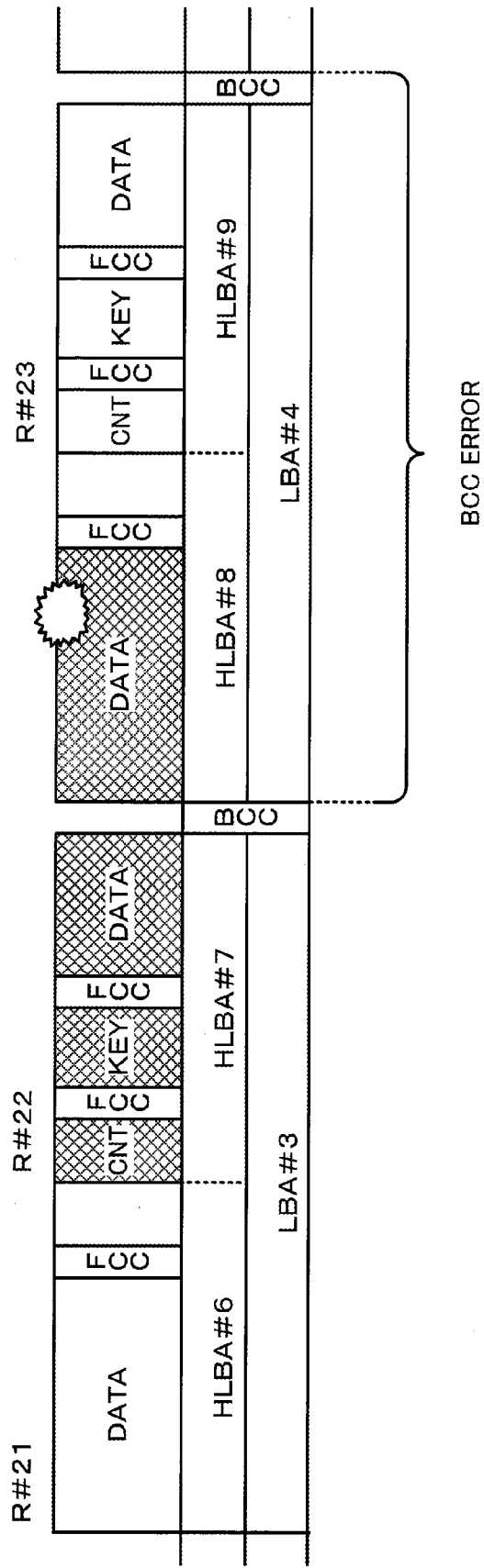
FIG. 14 illustrates a first example of a damaged CKD track according to the second embodiment.
Figure 15:
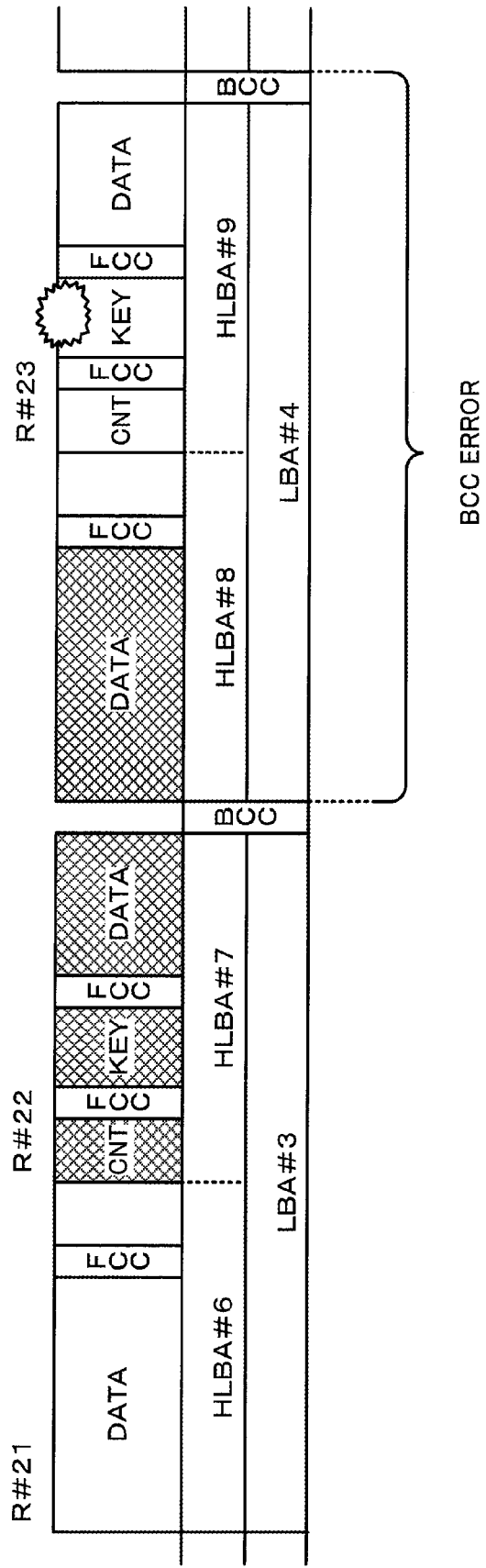
FIG. 15 illustrates a second example of a damaged CKD track according to the second embodiment.
Figure 16:
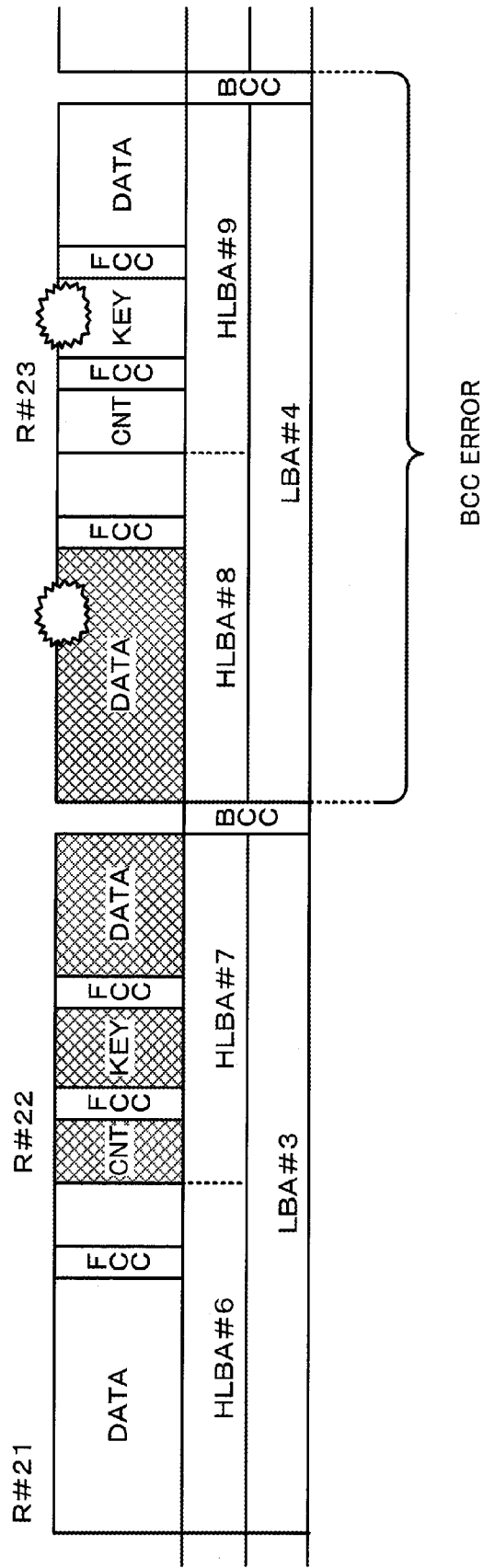
FIG. 16 illustrates a third example of a damaged CKD track according to the second embodiment.
Figure 17:
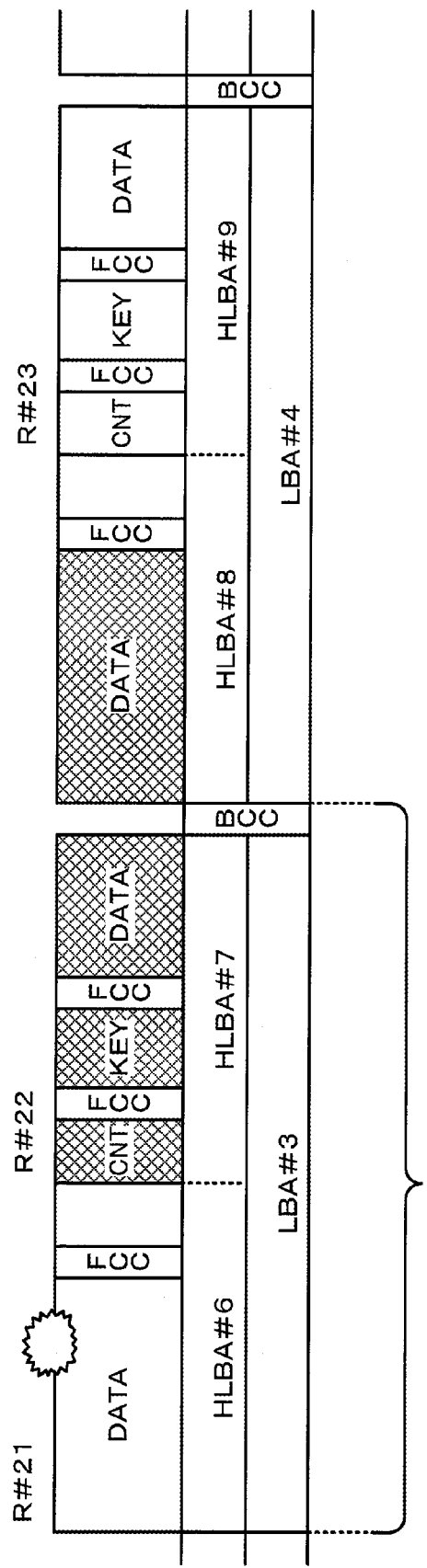
FIG. 17 illustrates a fourth example of a damaged CKD track according to the second embodiment.
Figure 18:
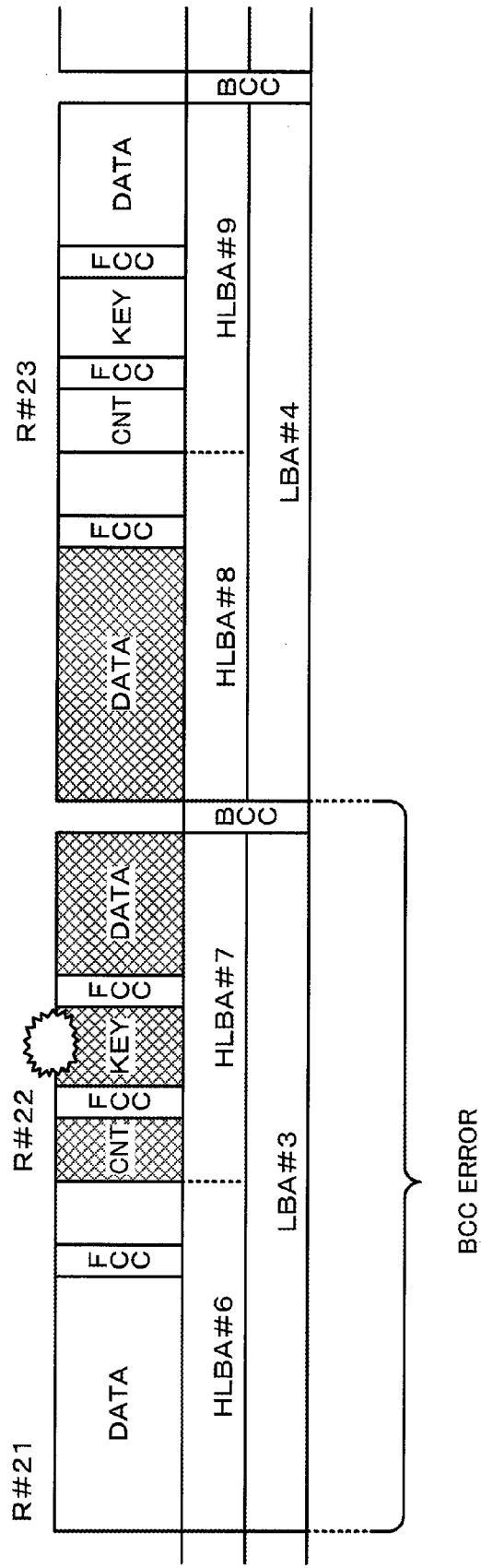
FIG. 18 illustrates a fifth example of a damaged CKD track according to the second embodiment.
Figure 19:
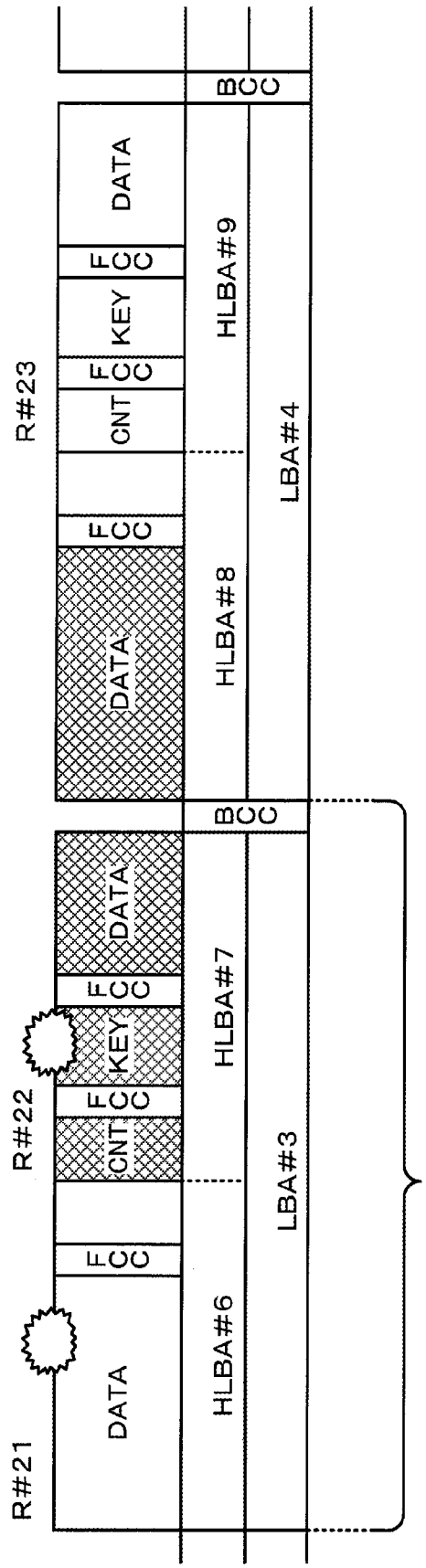
FIG. 19 illustrates a sixth example of a damaged CKD track according to the second embodiment.

In the following, a data error in RMW will be described with reference to examples of damaged CKD tracks illustrated in FIGS. 14 through 19. First, a first example 230 of a damaged CKD track will be described with reference to FIG. 14. FIG. 14 illustrates the first example 230 of a damaged CKD track according to the second embodiment. FIG. 15 illustrates a second example 231 of a damaged CKD track according to the second embodiment. FIG. 16 illustrates a third example 232 of a damaged CKD track according to the second embodiment. FIG. 17 illustrates a fourth example 233 of a damaged CKD track according to the second embodiment. FIG. 18 illustrates a fifth example 234 of a damaged CKD track according to the second embodiment. FIG. 19 illustrates a sixth example 235 of a damaged CKD track according to the second embodiment.

The first example 230 of a damaged CKD track is a case where, in an LBA containing the end portion of a record to be updated, there are two records, including the record to be updated, and there is a data error in an HLBA containing the record to be updated. In the first example 230 of a damaged CKD track, in an LBA #4 containing a record R#22 to be updated, there is a data error in an HLBA #8. The channel adapter 14 detects a BCC error in the LBA #4 upon RMW.

The second example 231 of a damaged CKD track is a case where, in an LBA containing the end portion of a record to be updated, there are two records, including the record to be updated, and there is a data error in an HLBA containing the record not to be updated. In the second example 231 of a damaged CKD track, in an LBA #4 containing a record R#22 to be updated, there is a data error in an HLBA #9. The channel adapter 14 detects a BCC error in the LBA #4 upon RMW.

The third example 232 of a damaged CKD track is a case where, in an LBA containing the end portion of a record to be updated, there is a data error in each of two HLBAs. In the third example 232 of a damaged CKD track, in an LBA #4 containing a record R#22 to be updated, there is a data error in each of an HLBA #8 and an HLBA #9. The channel adapter 14 detects a BCC error in the LBA #4 upon RMW.

The fourth example 233 of a damaged CKD track is a case where, in an LBA containing the top portion of a record to be updated, there are two records, including the record to be updated, and there is a data error in an HLBA containing the record not to be updated. In the fourth example 233 of a damaged CKD track, in an LBA #3 containing a record R#22 to be updated, there is a data error in an HLBA #6. The channel adapter 14 detects a BCC error in the LBA #3 upon RMW.

The fifth example 234 of a damaged CKD track is a case where, in an LBA containing the top portion of a record to be updated, there are two records, including the record to be updated, and there is a data error in an HLBA containing the record to be updated. In the fifth example 234 of a damaged CKD track, in an LBA #3 containing a record R#22 to be updated, there is a data error in an HLBA #7. The channel adapter 14 detects a BCC error in the LBA #3 upon RMW.

The sixth example 235 of a damaged CKD track is a case where, in an LBA containing the top portion of a record to be updated, there is a data error in each of two HLBAs. In the sixth example 235 of a damaged CKD track, in an LBA #3 containing a record R#22 to be updated, there is a data error in each of an HLBA #6 and an HLBA #7. The channel adapter 14 detects a BCC error in the LBA #3 upon RMW.

If the channel adapter 14 recovers data by a host retry in response to the BCC error illustrated in any of the first example 230 through the sixth example 235 of a damaged CKD track, the channel adapter 14 updates the BCC even in the case where there is an error in the record #21 or the record #23. In this case, it becomes impossible to detect a data error in the record #21 or the record #23. Therefore, it is needed to identify the position of a data error in units of HLBAs. Note that, although there is an FCC for checking for a data error in units of fields, it is not possible to identify the position of a data error in units of HLBAs using the FCC.

Figure 20:
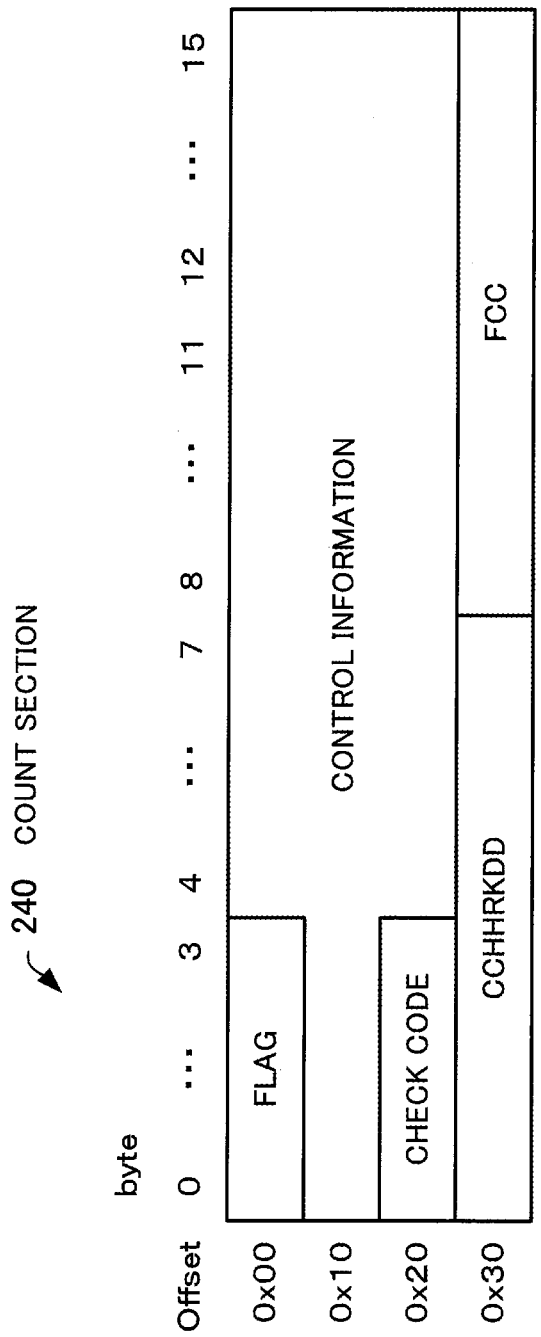
FIG. 20 illustrates an example of a format of a count section in which a check code is provided according to the second embodiment.

In view of the above, a check code (first verification information) is provided in the count section of a CKD record format so as to make it possible to detect a data error in an HLBA containing the count section. A count section in which a check code is provided will be described with reference to FIG. 20. FIG. 20 illustrates an example of a format of a count section 240 in which a check code is provided according to the second embodiment.

Upon receiving a count section in the CKD record formation as 8-byte data from the mainframe host 11, the channel adapter 14 adds control information to the count section 240 and writes the count section 240 including 64-byte data to the cache memory 16.

The count section 240 is a format including a 4-byte flag, 44-byte control information, an 8-byte CCHHRKDD, and an 8-byte FCC. The 44-byte control information includes a 4-byte check code.

The flag includes a flag 1 indicating whether the count section contains an error, a flag 2 indicating whether a key section contains an error, a flag 3 indicating whether a data section contains an error, and a flag 4 indicating whether a check code is valid or invalid. The flags 1 through 3 are set when an error is detected upon writing or reading data of each field. The flags 1 through 3 are referred to when reading data. If a flag is set, the channel adapter 14 reports a data error to the mainframe host 11. The set flag is reset if data writing has completed successfully by performing a retry.

The control information is specific to the HDD 12. Conventional control information includes unused reserved area, and the count section 240 has a check code area in the reserved area. The check code enables detection of a data error in an HLBA containing the count section 240. The count section 240 is located at the top among a plurality of fields of the CKD record format, and therefore is located in an HLBA containing the top portion of a record to be updated. Further, the count section 240 has a size that is stored within a single HLBA, and therefore is not divided to be stored in two or more HLBAs.

The CCHHRKDD is a count section received from the mainframe host 11, and the characters of the "CCHHRKDD" represent the data type and data size. More specifically, "CC" is 2-byte data representing the cylinder value, and "HH" is 2-byte data representing the head value. Further, "R" is 1-byte data representing the record number; "K" is 1-byte data representing the key length (the data length of the key section); and DD is 2-byte data representing the data length (the data length of the data section).

The FCC is a check code for guaranteeing the data of the count section 240.

Figure 21:
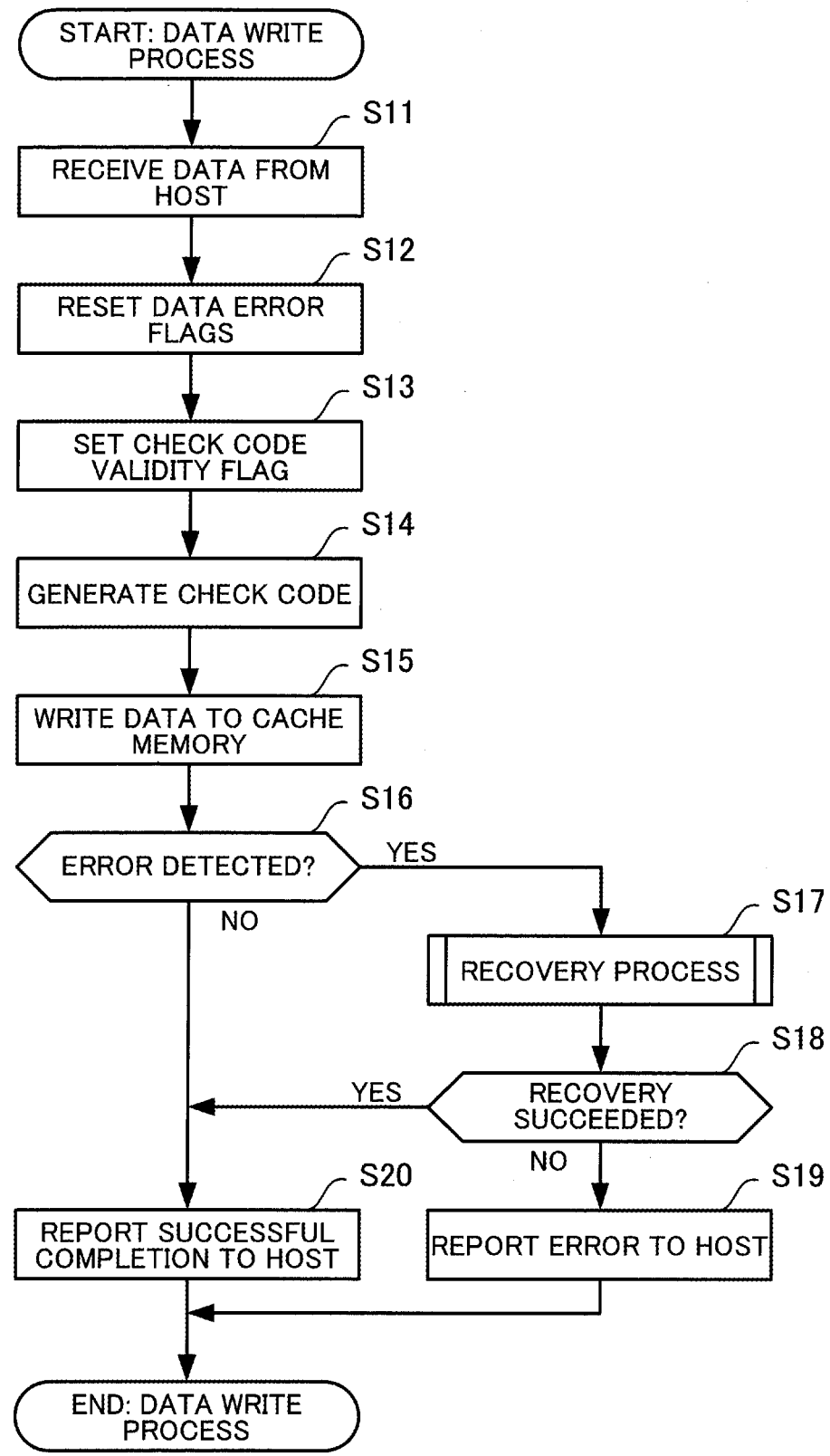
FIG. 21 is a flowchart of a data write process according to the second embodiment.

The following describes a process for determining a data error occurrence position and a process for performing recovery corresponding to the data error occurrence position. First, a data write process performed when writing data will be described with reference to FIG. 21. FIG. 21 is a flowchart of a data write process according to the second embodiment. The data write process is a process performed by the channel adapter 14 in response to a write I/O received from the mainframe host 11.

(Step S11) The channel adapter 14 receives data of a record to be written, from the mainframe host (host) 11.

(Step S12) The channel adapter 14 resets data error flags (flags 1 through 3) in the flag area of the count section.

(Step S13) The channel adapter 14 sets a check code validity flag (flag 4) in the flag area of the count section.

(Step S14) The channel adapter 14 generates a check code based on data to be written to the HLBA containing the count section.

(Step S15) The channel adapter 14 writes data to which control information is added to the cache memory 16.

(Step S16) The channel adapter 14 performs error detection on the data written to the cache memory 16. If an error is detected by the channel adapter 14, the process proceeds to step S17. If no error is detected, the process proceeds to step S20.

(Step S17) The channel adapter 14 performs a recovery process for recovering from the detected error. The recovery process will be described in greater detail below with reference to FIG. 22.

(Step S18) The channel adapter 14 determines whether the recovery from the detected error in the recovery process has succeeded. If the error recovery has succeeded, the process proceeds to step S20. If the error recovery has failed, the process proceeds to step S19.

(Step S19) The channel adapter 14 reports to the mainframe host 11 the successful completion of data write, and ends the data write process.

(Step S20) The channel adapter 14 reports to the mainframe host 11 an error (failure of data write), and ends the data write process.

Having received an error report, the mainframe host 11 performs recovery by retrying writing of the same data. If the retry fails a predetermined number of times, the mainframe host 11 determines a data write failure as a retry-out.

Figure 22:
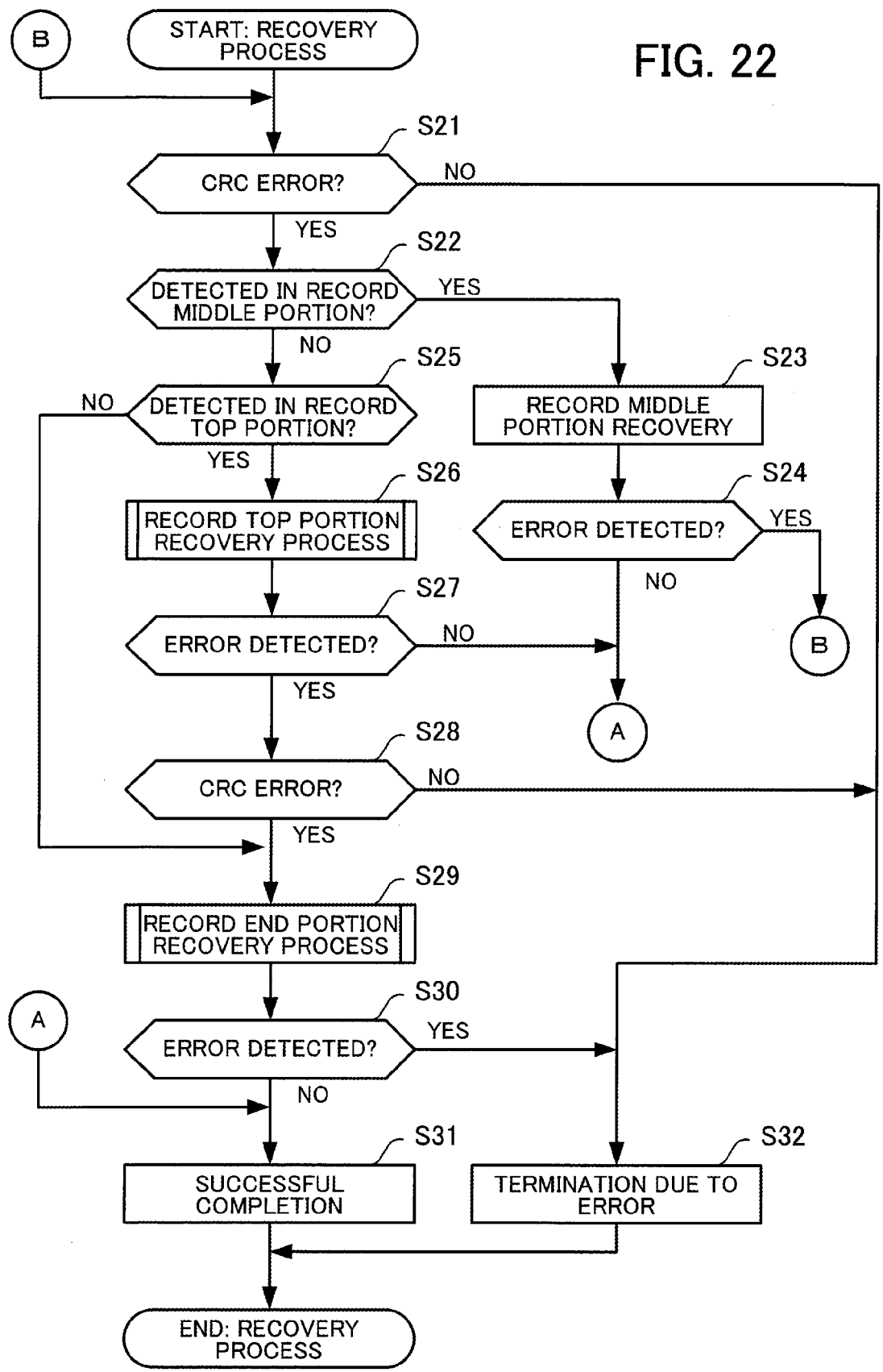
FIG. 22 is a flowchart of a recovery process according to the second embodiment.

In the following, a recovery process will be described with reference to FIG. 22. FIG. 22 is a flowchart of a recovery process according to the second embodiment. The recovery process is a process performed by the channel adapter 14 in step S17 of the data write process.

(Step S21) The channel adapter 14 determines whether the error detected in step S16 of the data write process is a CRC error of a BCC. If the detected error is a CRC error, the process proceeds to step S22. If the detected error is not a CRC error, the process proceeds to step S32. Errors that are not CRC errors are non-recoverable errors, and include hardware errors, for example.

(Step S22) The channel adapter 14 determines whether the CRC error is detected in an LBA containing the middle portion of a record to be updated. The determination of whether the CRC error is detected in the LBA containing the middle portion of the record to be updated may be made by calculating from the error occurrence address included in error information. If the CRC error is detected in the LBA containing the middle portion of the record to be updated, the process proceeds to step S23. If the CRC error is not detected in the LBA containing the middle portion of the record to be updated, the process proceeds to step S25.

(Step S23) The channel adapter 14 performs an error recovery for the middle portion of the record to be updated. The channel adapter 14 may recover the middle portion of the record to be updated from the error by discarding the erroneous data and performing a host retry.

(Step S24) The channel adapter 14 determines whether any other error is detected. If an error is detected, the process proceeds to step S21. If no error is detected, the process proceeds to step S31.

(Step S25) The channel adapter 14 performs this operation if in steps S21 through S24 the cause of the error is determined not to be in the middle portion of the record to be updated. The channel adapter 14 determines whether the CRC error is detected in an LBA containing the top portion of the record to be updated. The determination of whether the CRC error is detected in the LBA containing the top portion of the record to be updated may be made by calculating from the error occurrence address included in the error information. If the CRC error is detected in the LBA containing the top portion of the record to be updated, the process proceeds to step S26. If the CRC error is not detected in the LBA containing the top portion of the record to be updated, the process proceeds to step S29.

(Step S26) The channel adapter 14 performs a record top portion recovery process for recovering from the error detected in the top portion of the record to be updated. The record top portion recovery process will be described in greater detail below with reference to FIG. 23.

(Step S27) The channel adapter 14 determines whether any other error is detected. If an error is detected, the process proceeds to step S28. If no error is detected, the process proceeds to step S31.

(Step S28) The channel adapter 14 determines whether the error detected in step S27 is a CRC error of a BCC. If the detected error is a CRC error, the process proceeds to step S29. If the detected error is not a CRC error, the process proceeds to step S32.

(Step S29) The channel adapter 14 performs a record end portion recovery process for recovering from the error detected in the end portion of the record to be updated. The record end portion recovery process will be described in greater detail below with reference to FIG. 24.

(Step S30) The channel adapter 14 determines whether any other error is detected. If an error is detected, the process proceeds to step S32. If no error is detected, the process proceeds to step S31.

(Step S31) The channel adapter 14 outputs information indicating that the recovery process completes successfully, that is, information indicating a successful recovery. Thus, the channel adapter 14 is able to determine a successful recovery from the error detected in step S18 of the data write process. The channel adapter 14 ends the recovery process.

(Step S32) The channel adapter 14 outputs information indicating that the recovery process is terminated due to the error, that is, information indicating a failure of the recovery. Thus, the channel adapter 14 is able to determine a failure of the recovery from the detected error in step S18 of the data write process. The channel adapter 14 ends the recovery process.

Figure 23:
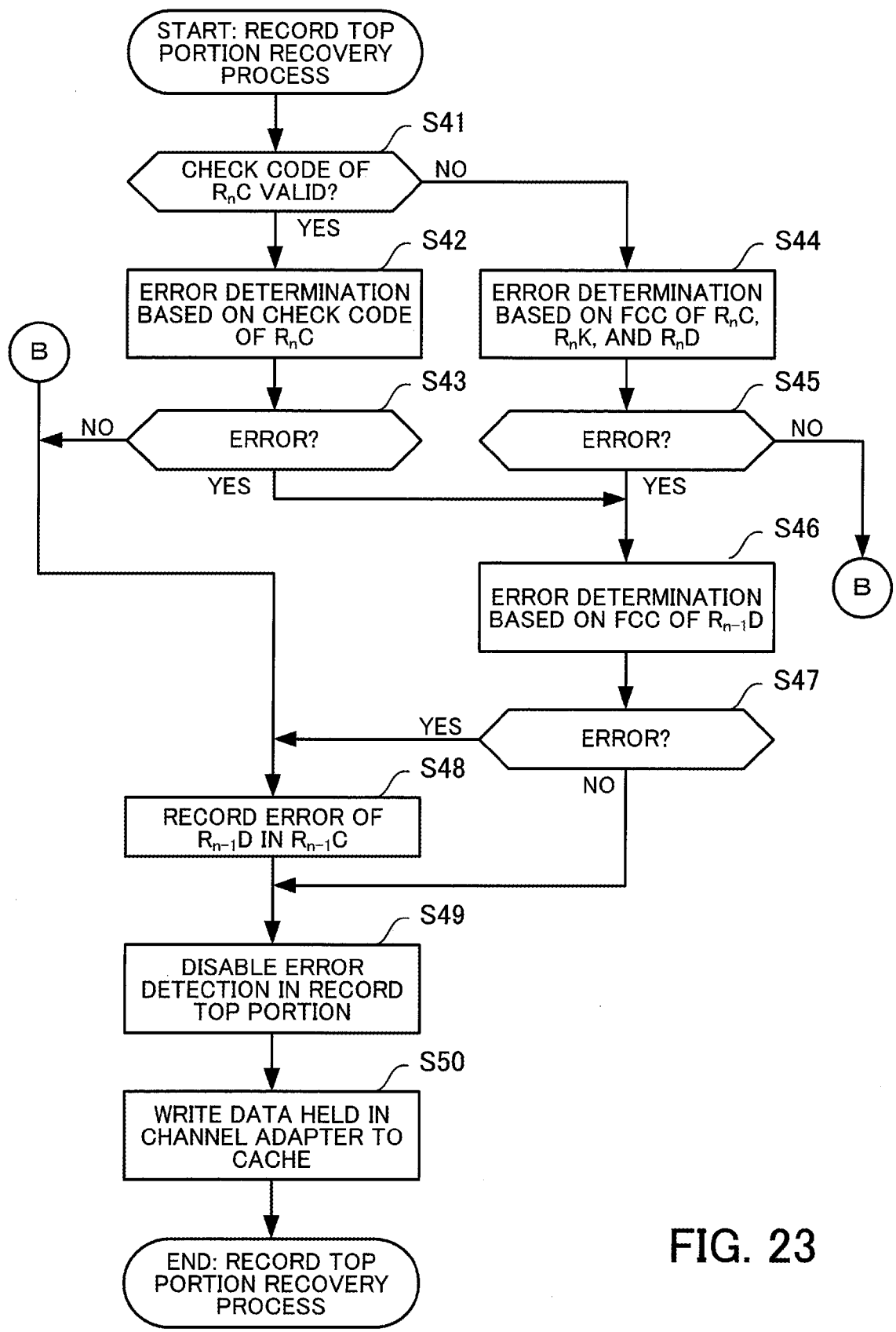
FIG. 23 is a flowchart of a record top portion recovery process according to the second embodiment.

In the following, a record top portion recovery process will be described with reference to FIG. 23. FIG. 23 is a flowchart of a record top portion recovery process according to the second embodiment. The record top portion recovery process is a process performed by the channel adapter 14 in step S26 of the recovery process.

(Step S41) The channel adapter 14 determines whether a check code of an $R_nC$ is valid. $R_nC$ represents a count section (C) of a record to be updated (Record n: $R_n$). The channel adapter 14 may determine the validity of the check code of $R_nC$ by referring to a flag 4 in the count section. If the check code of $R_nC$ is valid, the process proceeds to step S42. If the check code is invalid, the process proceeds to step S44.

(Step S42) Since the check code of $R_nC$ is valid, the channel adapter 14 performs error determination using the check code of $R_nC$. The channel adapter 14 performs the error determination by verifying data in an HLBA containing $R_nC$ using the check code.

(Step S43) The channel adapter 14 determines whether an error is detected. If an error is detected, the process proceeds to step S46. If no error is detected, the process proceeds to step S48. In this way, the storage apparatus 10 is able to perform data verification for an HLBA using a check code.

(Step S44) Since the check code of $R_nC$ is invalid, the channel adapter 14 performs error determination using FCCs by reading data from $R_nC$, $R_nK$, and $R_nD$. $R_nK$ represents a key section (K) of the record to be updated (Record n: $R_e$), and $R_nD$ represents a data section (D) of the record to be updated (Record n: $R_n$). The FCCs of the fields of the record to be updated are not always present in the HLBA containing the record top portion, and therefore it is often not possible to perform data verification using FCCs in units of HLBAs. For example, in the case of the second CKD record format pattern 211 and the third CKD record format pattern 212, the channel adapter 14 is not able to perform data verification in units of HLBAs for the data section of the record R#1. The channel adapter 14 is not able to determine whether an error is in the data section in an HLBA #1 (not illustrated) or the data section contained in the HLBA #2.

(Step S45) The channel adapter 14 determines whether an error is detected. If an error is detected, the process proceeds to step S46. If no error is detected, the process proceeds to step S48. In this way, the storage apparatus 10 is able to perform verification of data in an HLBA using a check code.

(Step S46) The channel adapter 14 performs error determination based on an FCC of $R_{n-1}D$.

(Step S47) The channel adapter 14 determines whether an error is detected. If an error is detected, the process proceeds to step S48. If no error is detected, the process proceeds to step S49.

(Step S48) Since an error is detected in the data of $R_{n-1}D$, the channel adapter 14 records a data error of $R_{n-1}D$ in a flag 3 of $R_{n-1}C$. In this way, the storage apparatus 10 is able to record a data error of a record that is present together with a record to be updated in an LBA.

(Step S49) The channel adapter 14 disables error detection in the record top portion. That is, the channel adapter 14 prevents detection of a CRC error in RMW that is performed in the LBA containing the record top portion.

(Step S50) The channel adapter 14 writes data of the record to be updated to the cache memory 16 by performing RMW, and ends the record top portion recovery process.

With this process, even if there is an error in an HLBA containing the top portion of a record to be updated, data in the HLBA containing the top portion of the record to be updated is recovered. Further, even if there is an error in an HLBA containing another record that is present together with the record to be updated in an LBA, error information (error detection information) is recorded in the count section of the other record.

Figure 24:
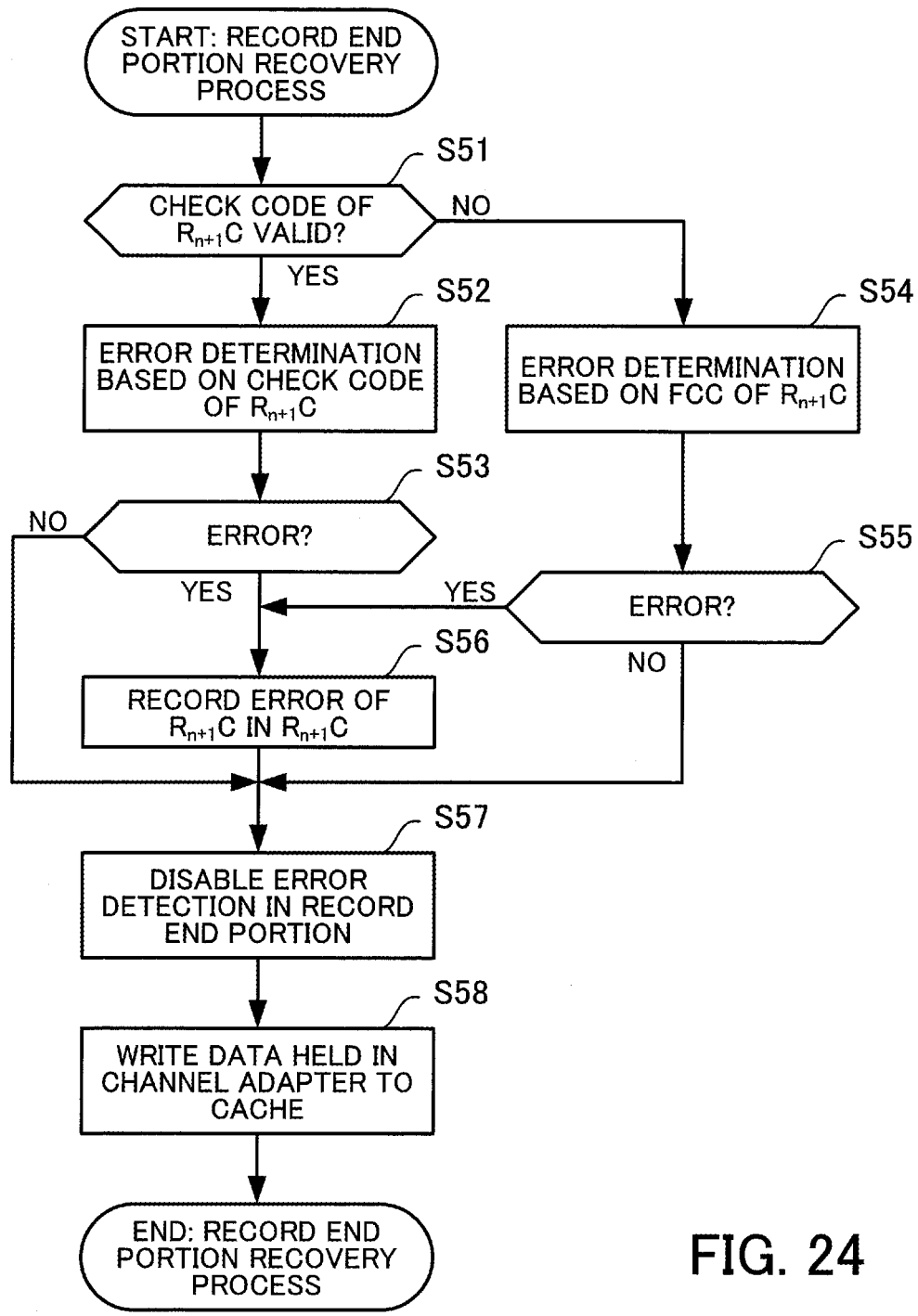
FIG. 24 is a flowchart of a record end portion recovery process according to the second embodiment.

In the following, a record end portion recovery process will be described with reference to FIG. 24. FIG. 24 is a flowchart of a record end portion recovery process according to the second embodiment. The record end portion recovery process is a process performed by the channel adapter 14 in step S29 of the recovery process.

(Step S51) The channel adapter 14 determines whether a check code of an $R_{n+1}C$ is valid. $R_{n+1}C$ represents the count section of a record that is in the LBA containing a record $R_n$ to be updated, and that is in an HLBA following the HLBA containing the record $R_n$ to be updated. The channel adapter 14 may determine the validity of the check code of $R_{n+1}C$ by referring to a flag 4 in the count section. If the check code of $R_{n+1}C$ is valid, the process proceeds to step S52. If the check code is invalid, the process proceeds to step S54.

(Step S52) Since the check code of $R_{n+1}C$ is valid, the channel adapter 14 performs error determination using the check code of $R_{n+1}C$. The channel adapter 14 performs the error determination by verifying data in the HLBA containing $R_{n+1}C$ using the check code.

(Step S53) The channel adapter 14 determines whether an error is detected. If an error is detected, the process proceeds to step S56. If no error is detected, the process proceeds to step S57. In this way, the storage apparatus 10 is able to perform verification of data in an HLBA using a check code.

(Step S54) Since the check code of $R_{n+1}C$ is invalid, the channel adapter 14 performs error determination using an FCC by reading data from $R_{n+1}C$. Note that the count section is a field of a fixed length smaller than an HLBA, and therefore the count section is located in the HLBA containing the top portion of the record to be verified.

Note that the other field such as $R_{n+1}K$, $R_{n+1}D$, and so on are fields of variable lengths, and are not always in the HLBA containing the top portion of the record to be verified. However, if the other fields are in the HLBA containing the count section, the other fields may also be the subject of verification. For example, in the case of the second CKD record format pattern 211 and the third CKD record format pattern 212, the channel adapter 14 is not able to perform data verification in units of HLBAs for the data section of the record R#3. The channel adapter 14 is able to perform error determination using FCCs for the count section and the key section in the HLBA #7.

(Step S55) The channel adapter 14 determines whether an error is detected. If an error is detected, the process proceeds to step S56. If no error is detected, the process proceeds to step S57. In this way, the storage apparatus 10 is able to perform verification of data in an HLBA using a check code.

(Step S56) Since an error is detected in the data of $R_{n+1}C$, the channel adapter 14 records a data error of $R_{n+1}C$ in a flag 1 of $R_{n+1}C$. In this way, the storage apparatus 10 is able to record a data error of a record that is present together with a record to be updated in an LBA.

(Step S57) The channel adapter 14 disables error detection in the record end portion. That is, the channel adapter 14 prevents detection of a CRC error in RMW that is performed in the LBA containing the record end portion.

(Step S58) The channel adapter 14 writes data of the record to be updated to the cache memory 16 by performing RMW, and ends the record end portion recovery process.

With this process, even if there is an error in an HLBA containing the end portion of a record to be updated, data in the HLBA containing the end portion of the record to be updated is recovered. Further, even if there is an error in an HLBA containing another record that is present together with the record to be updated in an LBA, error information (error detection information) is recorded in the count section of the other record.

Note that the channel adapter 14 performs a recovery process, a record top portion recovery process, and a record end portion recovery process, thereby functioning as a detection unit that detects an error and a recovery unit that performs recovery from errors. The channel adapter 14 also performs a data write process, thereby functioning as a data writing unit that writes data and a verification information adding unit that adds a check code (verification information).

Figure 25:
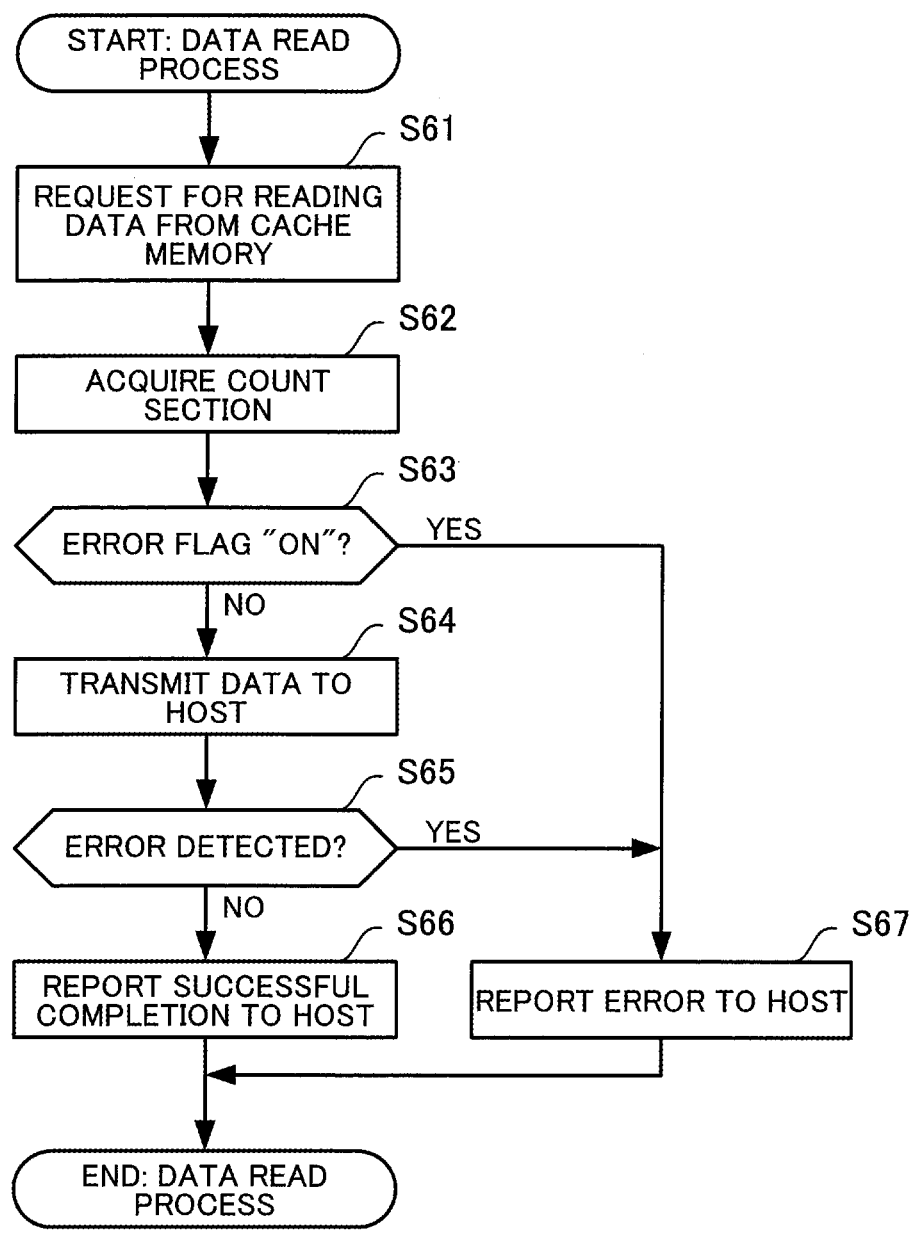
FIG. 25 is a flowchart of a data read process according to the second embodiment.

In the following, a data read process performed when reading data will be described with reference to FIG. 25. FIG. 25 is a flowchart of a data read process according to the second embodiment. The data read process is a process performed by the channel adapter 14 in response to a read I/O (data read request) received from the mainframe host 11.

(Step S61) The channel adapter 14 requests the controller module 15 to read data from the cache memory 16.

(Step S62) The channel adapter 14 confirms that the data is ready in the cache memory 16, and acquires the count section of a record to be read.

(Step S63) The channel adapter 14 determines whether a data error flag is set (ON) in the flag area of the count section. If the data error flag is set in the flag area of the count section, the process proceeds to step S67. If the data error flag is not set, the process proceeds to step S64.

(Step S64) The channel adapter 14 acquires the data length of the key section and the data length of the data section from the read count section, reads the data requested by the mainframe host 11 from the cache memory 16, and transmits the data to the mainframe host 11.

(Step S65) The channel adapter 14 determines whether the data transmission performed in step S64 has completed successfully. If the data transmission has completed successfully, that is, if no error is detected, the process proceeds to step S66. If the data transmission has failed, that is, if an error is detected, the process proceeds to step S67.

(Step S66) The channel adapter 14 reports to the mainframe host 11 the successful completion of data read, and ends the data read process.

(Step S67) The channel adapter 14 reports to the mainframe host 11 an error (failure of data read), and ends the data read process.

Having received an error report, the mainframe host 11 performs recovery by retrying reading of the same data. If the retry fails a predetermined number of times, the mainframe host 11 determines a data read failure as a retry-out.

With the processes described above, the storage apparatus 10 is able to determine a data error occurrence position using a check code and to perform recovery corresponding to the data error occurrence position.

More specifically, the storage apparatus 10 adds a check code to the count section of a record to be updated. Thus, in the case where there is an error in an HLBA containing the top portion of the record to be updated, the storage apparatus 10 is able to recover data in the HLBA containing the top portion of the record to be updated. Further, even in the case where there is an error in an HLBA containing another record that is present together with the top portion of the record to be updated in an LBA, the storage apparatus 10 is able to record error information in the count section of the other record. Furthermore, since the storage apparatus 10 records error information in the count section of the other record, even in the case where there is an error in the HLBA containing the other record that is present together with the record to be updated, the storage apparatus 10 is able to confirm that there is no error in the record to be updated and thus to write data.

Further, a check code is added to the count section of the other record that is present together with the record to be updated. Therefore, in the case where there is an error in the HLBA containing the other record, the storage apparatus 10 is able to record error information in the count section of the other record that is present together with the record to be updated. Note that although there are cases where it is not possible to determine an error in the end portion of the record to be updated, data may be recovered by overwriting by RMW in which detection of a CRC error is prevented. Furthermore, even in the case where there is an error in the count section of the other record or the top section containing the count section, the storage apparatus 10 records error information in the count section of the other record, and therefore is able to confirm that there is no error in the record to be updated and thus to write data.

In the storage apparatus 10, a check code is provided in the count section. However, the check code may be provided in any field other than the count section, such as the key section and so on, as long as the field is located at the top HLBA when data is written to the cache memory 16.

In the storage apparatus 10, the unit of storing data is an HLBA having half the size of an LBA. However, the unit of storing data may be a storage region obtained by dividing an LBA by an integer, such as one-fourth, one-eighth, and so on of the size of an LBA. For example, in the case where the unit of storing data in the HDD 12 is 4,096 bytes, the unit of storing data in the cache memory 16 may be 512 bytes, which is one-eighth of 4,096 bytes.

The storage apparatus 10 is able to handle existing data not having a check code in the count section. Therefore, the storage apparatus 10 may be realized by updating the firmware of an existing storage apparatus. In this case, the storage apparatus 10 may add a check code to the count section when writing data or when reading data, and may add check codes to accessed data in the order of access.

Figure 26:
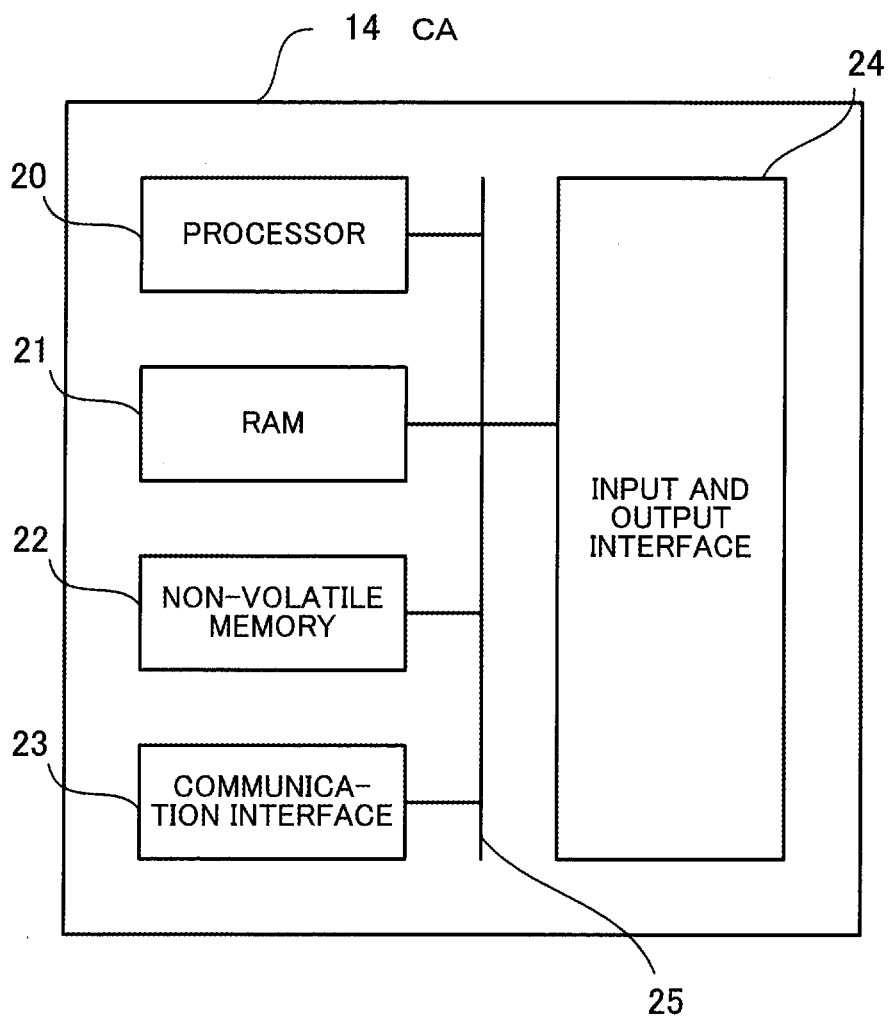
FIG. 26 illustrates an example of the hardware configuration of a channel adapter according to the second embodiment.

In the following, the hardware configuration of the channel adapter 14 of the second embodiment will be described with reference to FIG. 26. FIG. 26 illustrates an example of the hardware configuration of the channel adapter 14 according to the second embodiment.

The entire operation of the channel adapter 14 is controlled by a processor 20. A random access memory (RAM) 21 and a plurality of peripheral devices are connected to the processor 20 via a bus 25. The processor may be a multiprocessor. The processor 20 may be a central processing unit (CPU), a micro processing unit (MPU), a digital signal processor (DSP), an application specific integrated circuit (ASIC), or a programmable logic device (PLD). Alternatively, the processor 20 may be a combination of two or more of the devices selected from CPU, MPU, DSP, ASIC, and PLD.

The RAM 21 is used as a primary storage device of the channel adapter 14. The RAM 21 temporarily stores at least part of the OS program, firmware, and application programs (the control program and so on) that are executed by the processor 20. The RAM 21 also stores various types of data used for processing by the processor 20. The RAM 21 may include a cache memory, separately from a memory for storing various types of data.

The peripheral devices connected to the bus 25 include a non-volatile memory 22, an input and output interface 24, and a communication interface 23.

The non-volatile memory 22 retains stored data even when power supply to the channel adapter 14 is disconnected. Examples of the non-volatile memory 22 include semiconductor memory devices such as EEPROM and flash memory; HDD; and the like. The non-volatile memory 22 serves as a secondary storage device of the channel adapter 14. The non-volatile memory 22 stores the OS program, firmware, application programs, and various types of data.

The input and output interface 24 is connected to an input and output device (not illustrated) so as to perform input and output operations.

The communication interface 23 is connected to the channel 13.

With the hardware configuration described above, it is possible to realize the processing functions of the channel adapter 14 of the second embodiment. Note that not only the channel adapter 14, but also the controller module 15 and the storage control apparatus 1 of the first embodiment may be realized with a hardware configuration similar to that of the channel adapter 14.

The channel adapter 14 realizes the processing functions of the second embodiment by executing a program stored in a computer-readable storage medium, for example. The program describing the procedure to be performed by the channel adapter 14 may be stored in various storage media. For example, the program to be executed by the channel adapter 14 may be stored in the non-volatile memory 22. The processor 20 loads at least part of the program from the non-volatile memory 22 into the RAM 21 so as to execute the program. The program to be executed by the channel adapter 14 may also be stored in a portable storage medium, such as optical disc, memory device, memory card, and so on (not illustrated). Examples of optical discs include digital versatile disc (DVD), DVD-RAM, compact disc read only memory (CD-ROM), CD-Recordable (CD-R), CD-Rewritable (CD-RW), and so on. The memory device is a storage medium having a function to communicate with the input and output interface 24 or a device connection interface (not illustrated). For example, the memory device is capable of writing data to and reading data from a memory card, with use of a memory reader and writer. The memory card is a card-type storage medium.

The program stored in the portable storage medium may be executed after being installed into the non-volatile memory 22 under the control of, for example, the processor 20. Further, the processor 20 may execute the program by reading the program directly from the portable storage medium.

The above-described processing functions may be implemented by a computer. In this case, a program describing operations of the functions of the storage control apparatus 1 and the storage apparatus 10 (the channel adapters 14 and the controller modules 15) is provided. When the program is executed by a computer, the above-described processing functions are implemented on the computer. The program describing operations of the functions may be stored in a computer-readable storage medium. Examples of computer-readable storage media include magnetic storage devices, optical discs, magneto-optical storage media, semiconductor memory devices, and the like. Examples of magnetic storage devices include hard disk drive (HDD), flexible disk (FD), magnetic tapes, and the like. Examples of optical discs include DVD, DVD-RAM, CD-ROM, CD-RW, and the like. Examples of magneto-optical storage media include magneto-optical disk (MO) and the like.

For distributing the program, the program may be stored and sold in the form of a portable storage medium such as DVD, CD-ROM, and the like, for example. The program may also be stored in a storage device of a server computer, and transmitted from the server computer to other computers via a network.

For executing the program on a computer, the computer stores the program recorded in the portable storage medium or the program transmitted from the server computer in its storage device. Then, the computer reads the program from its storage device, and performs processing in accordance with the program. The computer may read the program directly from the portable storage medium, and execute processing in accordance with the program. Further, the computer may sequentially receive the program from a server computer connected over a network, and perform processing in accordance with the received program.

The above-described processing functions may also be implemented wholly or partly by using electronic circuits such as DSP, ASIC, PLD, and the like.

A storage control apparatus, a program for controlling a storage control apparatus, and a method of controlling a storage apparatus according to an aspect make it possible to improve the recovery performance upon occurrence of a data error.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus that converts data in a variable-length data format including a predetermined field into data in a fixed-length data format and stores the converted data in the fixed-length data format in a storage apparatus, the storage control apparatus comprising:
one or more processors configured to perform a procedure including:
writing the data in the variable-length data format to one or more consecutive divided regions in a data storage memory, each of the divided regions having a divided length obtained by dividing the fixed-length data; and
adding verification information to the predetermined field of the variable-length data format that is written to the one or more divided regions, the verification information allowing checking for a data error in the divided region where the predetermined field is located.

2. The storage control apparatus according to claim 1, wherein the procedure further includes, when data in a top or end divided region among the one or more divided regions is to be part of the data in the fixed-length data format, reading the data in the fixed-length data format from the storage apparatus, overwriting the read data with the data that is to be part of the data in the fixed-length data format, and writing the overwritten data to the divided regions.

3. The storage control apparatus according to claim 2, wherein the predetermined field to which the verification information is added has a fixed length and is located in the top divided region among the one or more divided regions.

4. The storage control apparatus according to claim 3, wherein the procedure further includes, when the data in the top divided region is to be part of the data in the fixed-length data format, detecting an error in the data in the top divided region based on the verification information.

5. The storage control apparatus according to claim 4, wherein the procedure further includes, when an error is detected in existing data other than the data in the top divided region in the data in the fixed-length data format, adding error detection information to the predetermined field of the existing data.

6. The storage control apparatus according to claim 3, wherein the procedure further includes, when the data in the end divided region among the one or more divided regions is to be part of the data in the fixed-length data format, detecting an error in existing data other than the data in the end divided region in the data in the fixed-length data format, based on the verification information of the existing data.

7. The storage control apparatus according to claim 6, wherein the procedure further includes, when an error is detected in the existing data, adding error detection information to the predetermined field of the existing data.

8. The storage control apparatus according to claim 1, wherein the procedure further includes, when an error is detected in data to be written, performing recovery by overwriting the data to be written.

9. The storage control apparatus according to claim 1, wherein:
the variable-length data format includes a count section, a key section, and a data section; and
the predetermined field is the count section.

10. The storage control apparatus according to claim 1, wherein the adding includes adding the verification information independently of second verification information that is provided for each field.

11. A non-transitory computer-readable storage medium storing a control program that causes a storage control apparatus to perform a procedure, wherein the storage control apparatus converts data in a variable-length data format including a predetermined field into data in a fixed-length data format and stores the converted data in the fixed-length data format in a storage apparatus, the procedure comprising: writing the data in the variable-length data format to one or more consecutive divided regions in a data storage memory, each of the divided regions having a divided length obtained by dividing the fixed-length data; and; adding verification information to the predetermined field of the variable-length data format that is written to the one or more divided regions, the verification information allowing checking for a data error in the divided region where the predetermined field is located.

12. A storage control method that converts data in a variable-length data format including a predetermined field into data in a fixed-length data format and stores the converted data in the fixed-length data format in a storage apparatus, the method comprising:
adding, by a computer, when writing the data in the variable-length data format to one or more consecutive divided regions in a data storage memory, verification information to the predetermined field of the variable-length data format that is written to the one or more divided regions, each of the divided regions having a divided length obtained by dividing the fixed-length data, the verification information allowing checking for a data error in the divided region where the predetermined field is located.

* * * * *